(12) United States Patent
Michishita

(10) Patent No.: US 11,585,028 B2
(45) Date of Patent: Feb. 21, 2023

(54) LINEAR ACTUATOR AND TUFTING MACHINE USING THE SAME

(71) Applicant: Michishita Iron Works Co., Ltd., Osaka (JP)

(72) Inventor: Kenji Michishita, Sakai (JP)

(73) Assignee: MICHISHITA IRON WORKS CO., LTD., Osaka (JP)

( * ) Notice: Subject to any disclaimer, the term of this patent is extended or adjusted under 35 U.S.C. 154(b) by 584 days.

(21) Appl. No.: 16/654,237

(22) Filed: Oct. 16, 2019

(65) Prior Publication Data
US 2020/0318275 A1 Oct. 8, 2020

(30) Foreign Application Priority Data

Apr. 8, 2019 (JP) .............................. JP2019-073562

(51) Int. Cl.
| | |
|---|---|
| *H02K 5/18* | (2006.01) |
| *H02K 1/18* | (2006.01) |
| *D05C 15/20* | (2006.01) |
| *H02K 33/12* | (2006.01) |
| *H02K 1/06* | (2006.01) |

(52) U.S. Cl.
CPC .............. *D05C 15/20* (2013.01); *H02K 1/18* (2013.01); *H02K 5/18* (2013.01); *H02K 33/12* (2013.01); *H02K 1/06* (2013.01)

(58) Field of Classification Search
CPC ........ D05C 15/20; H02K 33/12; H02K 33/14; H02K 41/031; H02K 1/18
See application file for complete search history.

(56) References Cited

U.S. PATENT DOCUMENTS

| | | |
|---|---|---|
| 5,979,344 A | 11/1999 | Christman, Jr. |
| 6,283,052 B1 | 9/2001 | Pratt |
| 2003/0005869 A1 | 1/2003 | Hicks |
| 2004/0025767 A1 | 2/2004 | Card et al. |
| 2005/0056197 A1 | 3/2005 | Card et al. |
| 2005/0109253 A1 | 5/2005 | Johnston |
| 2005/0204975 A1 | 9/2005 | Card et al. |
| 2006/0150882 A1 | 7/2006 | Johnston |

(Continued)

FOREIGN PATENT DOCUMENTS

| | | | |
|---|---|---|---|
| JP | 60009357 A | * 1/1985 | ........... H02K 41/031 |
| JP | 03-14976 | 2/1991 | |

(Continued)

OTHER PUBLICATIONS

Hasegawa (JP 60009357 A) English Translation (Year: 1985).*
Extended European Search Report dated May 13, 2020 in corresponding European Patent Application No. 19204881.7.

*Primary Examiner* — Tulsidas C Patel
*Assistant Examiner* — Robert E Mates
(74) *Attorney, Agent, or Firm* — Wenderoth, Lind & Ponack, L.L.P.

(57) ABSTRACT

A linear actuator, and a tufting machine including the linear actuator are provided. The linear actuator includes a casing, a magnet unit, and a coil unit. The magnet unit includes a magnet and a magnet mounting plate. The magnet is configured to sandwich side surfaces of the magnet mounting plate. The coil unit faces the magnet. The magnet unit is configured to reciprocate along an axial direction in the casing, between the coil unit, based on magnetization and demagnetization of the coil unit.

6 Claims, 21 Drawing Sheets

(56) References Cited

U.S. PATENT DOCUMENTS

| | | | |
|---|---|---|---|
| 2006/0272564 A1 | 12/2006 | Card et al. | |
| 2007/0119356 A1 | 5/2007 | Johnston | |
| 2015/0091393 A1* | 4/2015 | Hayner | ................... H02K 9/22 |
| | | | 310/12.29 |
| 2015/0091395 A1 | 4/2015 | Spivak | |
| 2016/0305055 A1 | 10/2016 | Hall et al. | |
| 2017/0264146 A1 | 9/2017 | Shibata et al. | |
| 2018/0371663 A1 | 12/2018 | Hall et al. | |

FOREIGN PATENT DOCUMENTS

| | | | |
|---|---|---|---|
| JP | 06-87449 | 3/1994 | |
| JP | 10-237755 | 9/1998 | |
| JP | 11-315465 | 11/1999 | |
| JP | 2000-14190 | 1/2000 | |
| JP | 2001-348768 | 12/2001 | |
| JP | 2006-524753 | 11/2006 | |
| JP | 2007-89382 | 4/2007 | |
| JP | 2007-107150 | 4/2007 | |
| JP | 2007-512451 | 5/2007 | |
| JP | 2008-144349 | 6/2008 | |
| JP | 2008-527199 | 7/2008 | |
| JP | 2008-200947 | 9/2008 | |
| JP | 2014-29057 | 2/2014 | |
| JP | 2016-123213 | 7/2016 | |
| JP | 2016-178749 | 10/2016 | |
| JP | 2018-078668 | 5/2018 | |
| WO | WO-9715708 A1 * | 5/1997 | ............. D04H 18/02 |

* cited by examiner

ONE END SIDE ←——— Y-AXIS ———→ THE OTHER END SIDE

ONE END SIDE ←— Y-AXIS —→ THE OTHER END SIDE

LINEAR ACTUATOR AND TUFTING MACHINE USING THE SAME

BACKGROUND OF THE INVENTION

Technical Field

The present invention relates to a linear actuator, and in particular, to a linear actuator that can be used in a manufacturing apparatus requiring a highly accurate and high-speed reciprocating mechanism, such as a tufting machine.

Related Art

Conventionally, for example, a tufting machine forms a loop with a thread in a base fabric by reciprocating up and down a needle bar to which, on the same straight line, many needles are attached and reciprocating the needle bar along the axis of the needle bar.

In general, for example, an eccentric crank mechanism is used as a mechanism for reciprocating the needle bar up and down. On the other hand, as a mechanism for reciprocating the needle bar in the axial direction, for example, an actuator combining a servo motor and a ball screw has been used (see JP 2014-29057 A).

However, in an actuator using a servo motor, even if the needle bar is attempted to be reciprocated at a predetermined speed in the axial direction, there is a problem chat when the speed is increased, the needle bar cannot reach a predetermined position and the servo motor stops.

In short, although speeding up of the reciprocating movement of the needle bar in the vertical direction is already achieved, speeding up of the reciprocating movement of the needle bar in the axial direction has a limit, and the ability of the tufting machine has not been fully exhibited.

In addition, since the ball screw for converting rotational movement of the servo motor into reciprocating movement is likely to be worn and has low durability, attempting to secure the desired movement accuracy needs to replace the ball screw in a short period of time, so that the maintenance takes time and effort.

In view of the above problems, the present invention has an object to provide a linear actuator that is driven with high accuracy and high speed and that does not take time and effort in maintenance, and a tufting machine using the linear actuator.

SUMMARY CF THE INVENTION

To solve the above problem, the linear actuator according to the present invention has a configuration that includes: a casing being tubular; a magnet unit configured to sandwich both side surfaces at least facing each other of a magnet mounting plate with a magnet, the magnet unit supported to be configured to reciprocate along an axial direction in the casing; and a coil unit arranged to face the magnet of the magnet unit. Based on magnetization and demagnetization of the coil unit, the magnet unit reciprocates between the coil units.

According to the present invention, the magnet mounting plate of the linear actuator can be reciprocated with high accuracy and high speed by magnetic force. Therefore, for example, the productivity of the tufting machine can be increased.

In addition, since a ball screw with low durability is not used, there is no need for replacing the ball screw due to deterioration, the maintenance period is made longer, and the maintenance does not take time and effort.

As an embodiment of the present invention, the magnet mounting plate may have an inverted T-shape in cross section.

According to the present embodiment, the magnet unit can be supported via the horizontal board of the magnet mounting plate. Therefore, a highly accurate and high-speed linear actuator can be obtained by performing a stable reciprocating motion.

As another embodiment of the present invention, the magnet mounting plate may have an I-shape in cross section. According to the present embodiment, a linear actuator with a small number of components and assembly man-hours can be obtained.

As another embodiment of the present invention, the magnet mounting plate may have an H-shape in cross section.

According to the present embodiment, since magnets can be attached to a large number of surfaces, a linear actuator having a large driving force can be obtained.

As a different embodiment of the present invention, the coil unit may have a cooling fin arranged on an outward surface.

According to the present embodiment, the heat generated by the coil unit can be efficiently discharged and cooled, and problems due to heat generation can be avoided.

The tufting machine according to the present invention is configured as a drive source for reciprocating the needle bar in the axial direction.

According to the present invention, the magnet mounting plate of the linear actuator can be reciprocated with high accuracy and high speed by magnetic force. Therefore, a tufting machine with high productivity can be obtained.

In addition, since a ball screw with low durability is not used, a tufting machine can be obtained in which there is no need for replacing the ball screw due to deterioration, the maintenance period is made longer, and the maintenance does not take time and effort.

As a different embodiment of the present invention, a plurality of needle bars may be arranged in parallel.

According to the present embodiment, there is an effect that a tufting machine capable of producing a carpet having a complicated pattern with high productivity can be obtained.

DETAILED DESCRIPTION

An embodiment of a linear actuator according to the present invention will be described with reference to the accompanying drawings of FIGS. 1 to 12.

It should be noted that the linear actuator 10 according to the present embodiment can be applied to a tufting machine 60 described below, for example, as shown in FIGS. 13 to 25.

Figure 8:
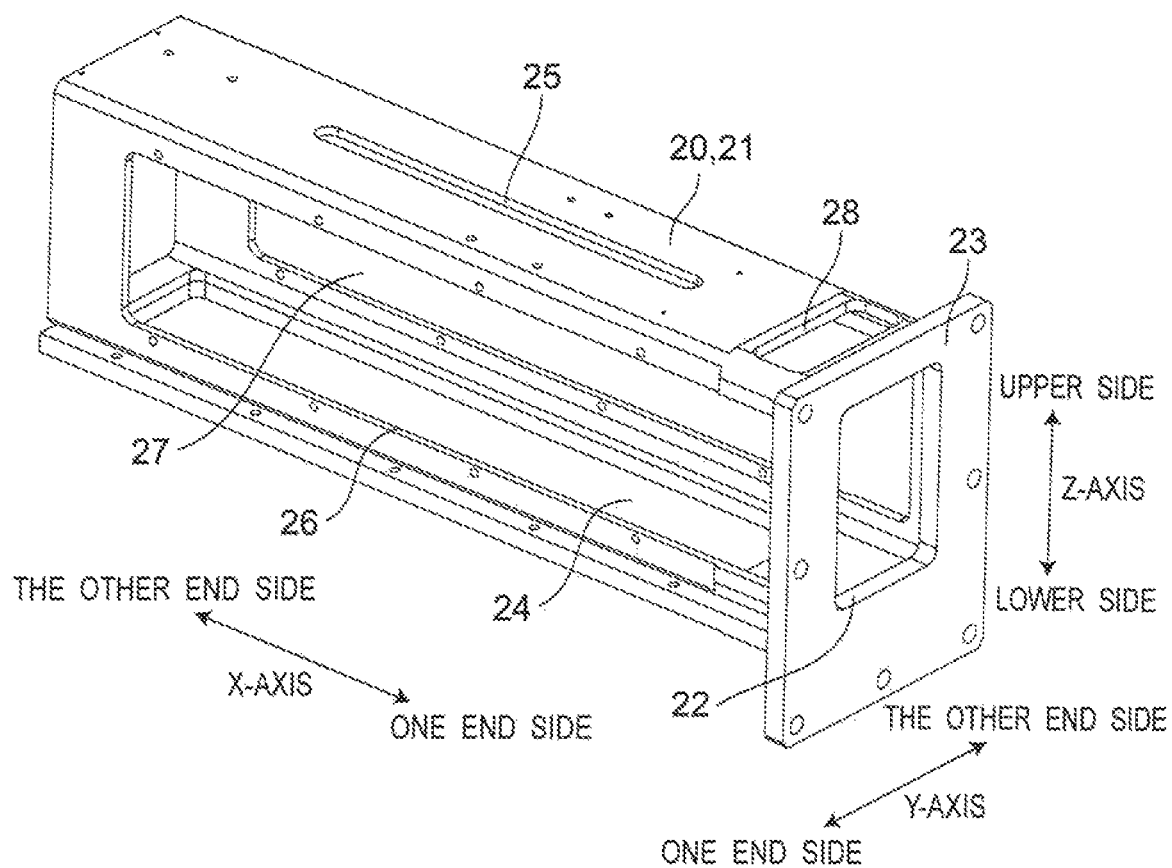
FIG. 8 is a perspective view shewing only the casing shewn in FIG. 1.
Figure 9:
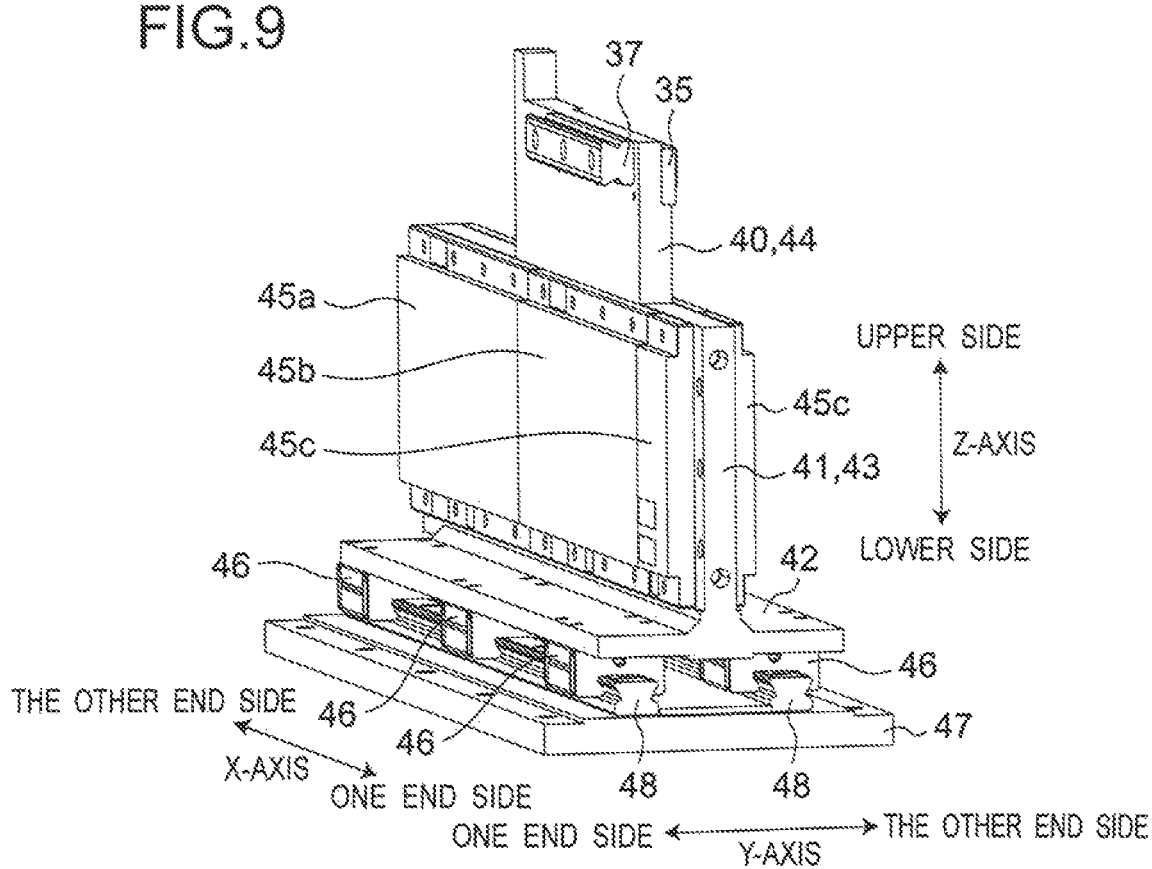
FIG. 9 is a perspective view of the magnet unit shown in FIG. 1.
Figure 10:
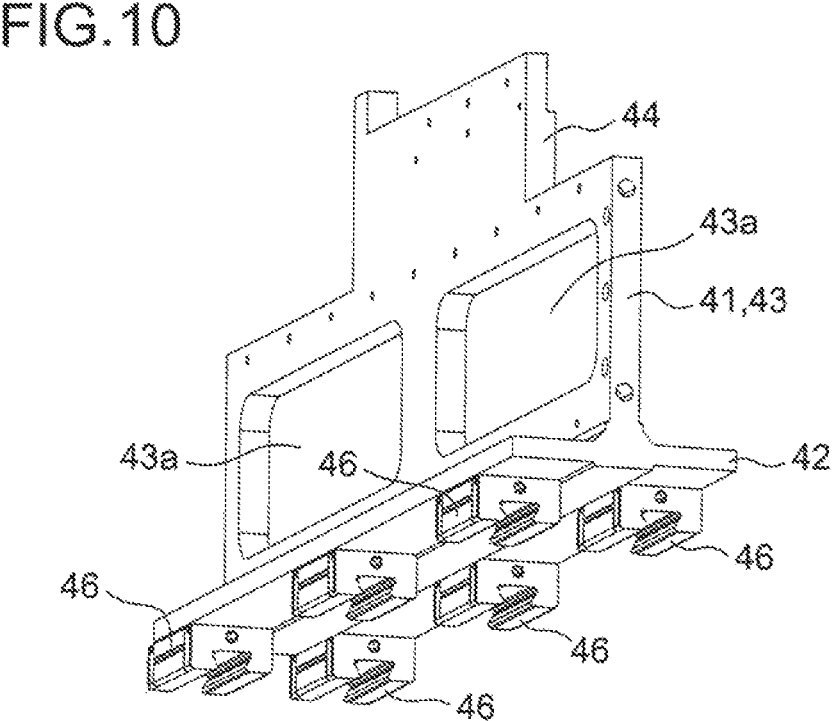
FIG. 10 is a perspective view of the magnet mounting plate shown in FIG. 9.

As shown in FIGS. 8 to 10, the linear actuator 10 includes a casing 20, a magnet unit 40, and a pair of coil units 50 and 50.

As shown in FIG. 8, the casing 20 includes a tubular casing main body 21 having a rectangle in cross section, and is provided with a mounting plate 23 having a through hole 22 on one end side in the X-axis direction of the casing main body 21. In addition, the casing main body 21 is provided with a mounting port 24 for mounting the magnet unit 40 on the lower surface thereof, and has a slide groove 25 formed on the upper surface thereof. Then, mounting ports 26 and 27 for mounting the coil units 50 and 50 are provided on both side surfaces of the casing main body 21, respectively. Furthermore, a mounting port 28 is provided between the mounting plate 23 and the slide groove 25.

It should be noted that needless to say, the casing 20 is not limited to the above-described shape, may be formed by combining shape steels, and the outer shape can be changed as necessary.

Figure 5:
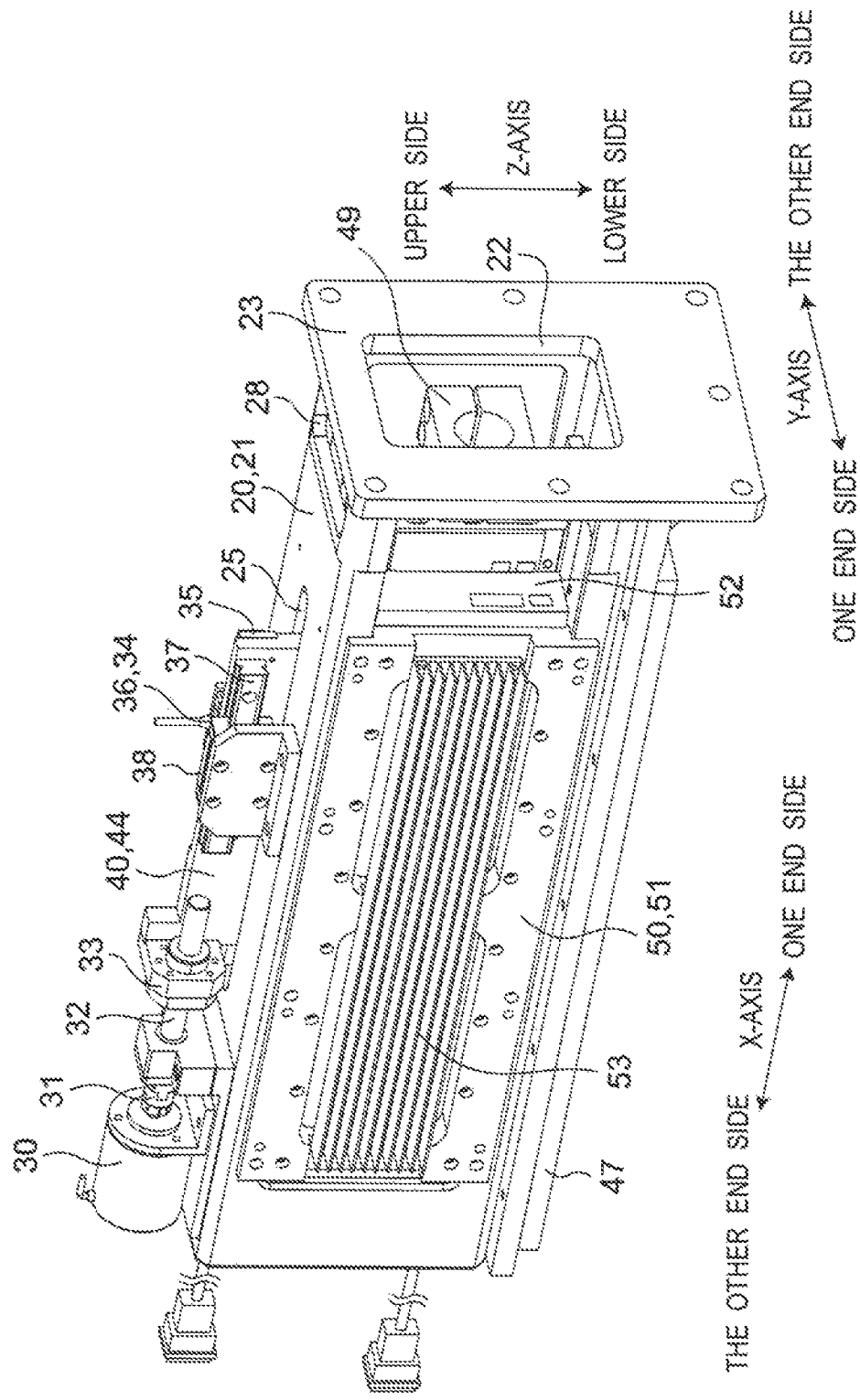
FIG. 5 is a perspective view showing a state where a dustproof cover is removed from the linear actuator shown in FIG. 1.
Figure 6:
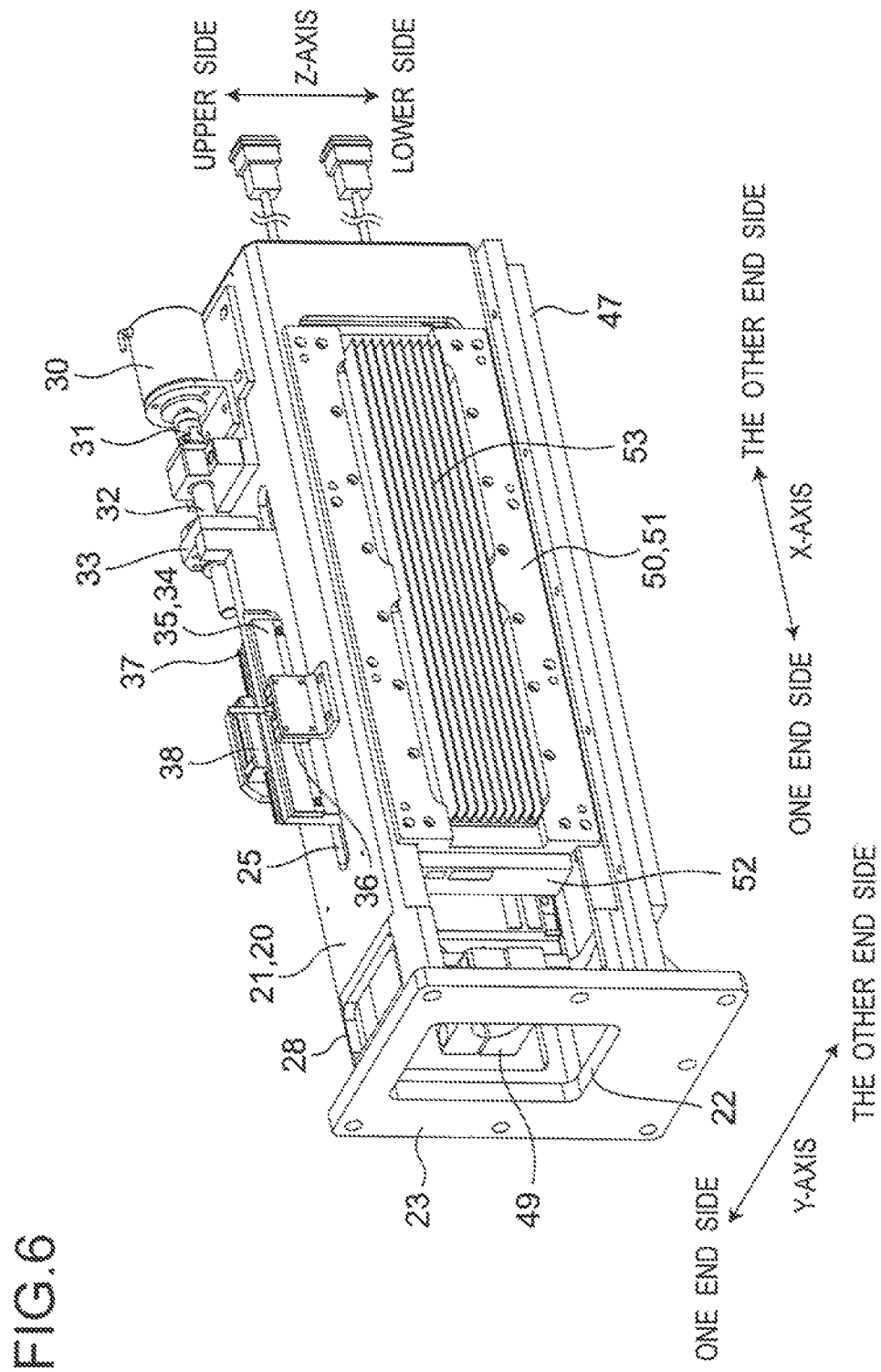
FIG. 6 is a perspective view of the linear actuator shown in FIG. 5 as viewed from a different angle.
Figure 7:
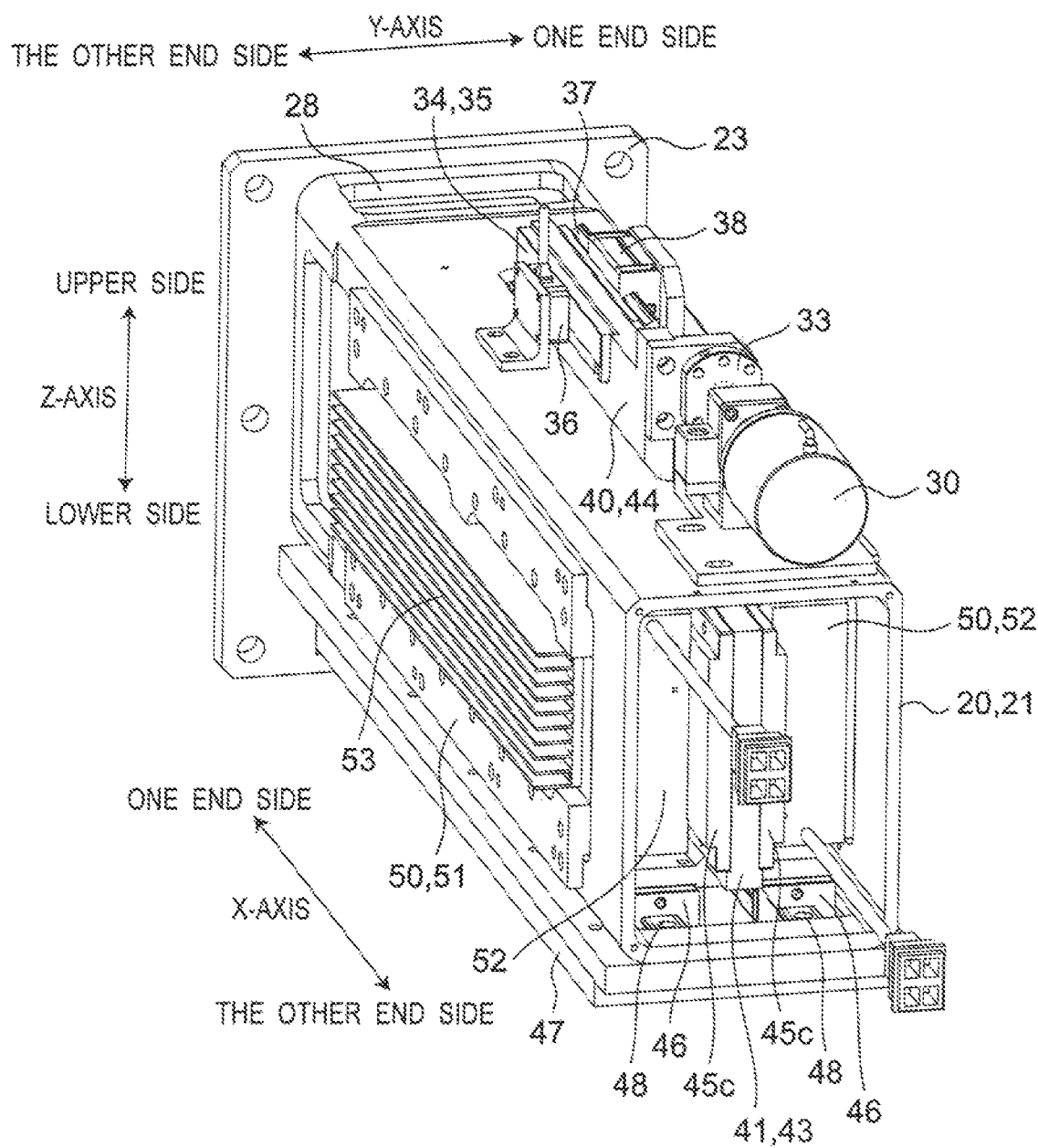
FIG. 7 is a perspective view of the linear actuator shown in FIG. 5 as viewed from another angle.

As shown in FIGS. 5 and 6, on the upper surface of the casing main body 21, a rotary encoder 30 and a linear encoder 34 are arranged. Since the rotary encoder 30 and the like are arranged on the upper surface of the casing main body 21, there is an advantage that assembly work and adjustment work are easy.

As shown in FIG. 5, the rotary encoder 30 is coupled to a coupling shaft 32 via a coupling member 31. The coupling shaft 32 is inserted through a ball screw 33. The ball screw 33 is fixed to a protruding portion 44 of a magnet mounting plate 41 described below protruding from the slide groove 25 of the casing main body 21. Therefore, when the magnet mounting plate 41 reciprocates in the X-axis direction, the ball screw 33 rotates the coupling shaft 32, and the rotary encoder 30 detects the displacement of the magnet mounting plate 41.

As shown in FIG. 6, the linear encoder 34 includes a scale base 35 and a detection head 36. The scale base 35 is attached to the protruding portion 44 of the magnet mounting plate 41. In addition, the detection head 36 is fixed to the upper surface of the casing main body 21 so as to face the scale base 35. Therefore, when the magnet mounting plate 41 reciprocates, the scale base 35 also reciprocates, and the detection head 36 detects the displacement of the magnet mounting plate 41.

Figure 1:
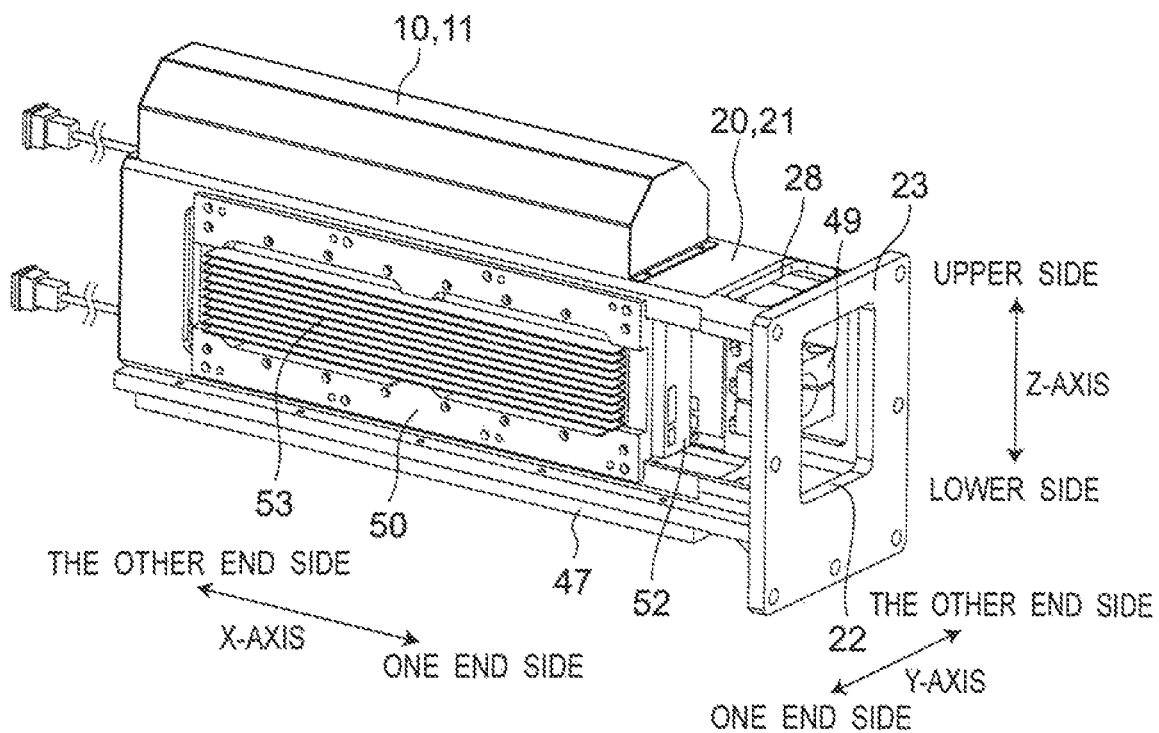
FIG. 1 is a perspective view showing an embodiment of a linear actuator according to the present invention.
Figure 2:
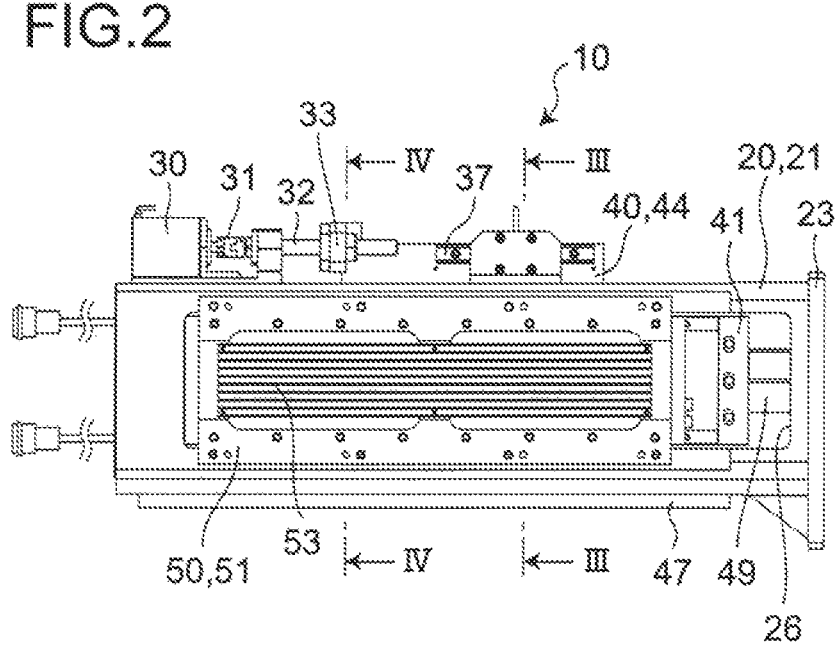
FIG. 2 is a front view of the linear actuator shown in FIG. 1.

A guide block 38 is fixed to the upper surface of the casing main body 21. The guide block 38 is engaged with a guide rail 37 attached to the protruding portion 44 of the magnet mounting plate 41. Therefore, the magnet mounting plate 41 slidable in the X-axis direction is regulated in position by the guide block 38, and performs an accurate reciprocating movement. It should be noted that as shown in FIG. 1, the upper surface of the casing main body 21 is covered with a dustproof cover 11.

As shown in FIGS. 9 and 10, the magnet unit 40 is attached with a magnet mounting plate 41 having an inverted T-shape in cross section and three magnets 45a, 43b, and 45c on both side surfaces thereof.

The magnet mounting plate 41 has an inverted T-shape in cross section in which a vertical board 43 is erected at the center of the upper surface of a horizontal board 42. As shown in FIG. 10, the vertical board 43 is provided with a pair of through holes 43a and 43a for weight reduction. In addition, a protruding portion 44 is projectingly provided at a substantially central portion of the upper end surface of the vertical board 43. The scale base 35 and the guide rail 37 are attached in parallel to both respective surfaces of the upper end edge portion of the protruding portion 44. Then, on the bottom surface of the horizontal board 42 of the magnet mounting plate 41, as shown in FIG. 10, three slide blocks 46 are arranged on the same straight line at equal intervals in two rows.

In addition, as shown in FIG. 9, the magnet unit 40 is slidably mounted on the two guide rails 46 and 48 arranged in parallel on the slide base 47 via the slide block 46.

Furthermore, as shown in FIGS. 5 and 6, the magnet unit 40 has a clamp member 49 attached to one end side in the X-axis direction of the magnet mounting plate 41 so as to couple the drive shaft 72.

It should be noted that the magnet mounting plate 41 is not limited to having an inverted T-shape in cross section, and may have a T-shape in cross section, an I-shape in cross section, or an H-shape in cross section. With an I-shape in cross section, the number of components such as the slide block 46, the assembly man-hour, and the weight can be reduced. In addition, if the magnet has an H-shape in cross section, the magnet can be attached to four places, so that there is an advantage that a high-power linear actuator can be obtained.

Figure 11:
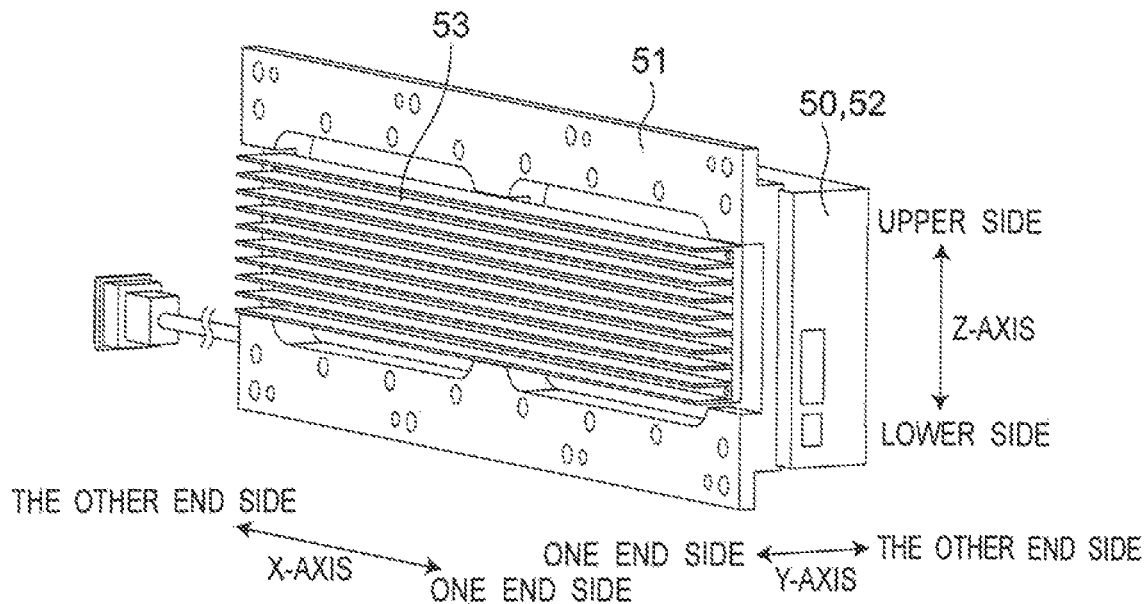
FIG. 11 is a perspective view showing only the coil unit shown in FIG. 1.
Figure 12:
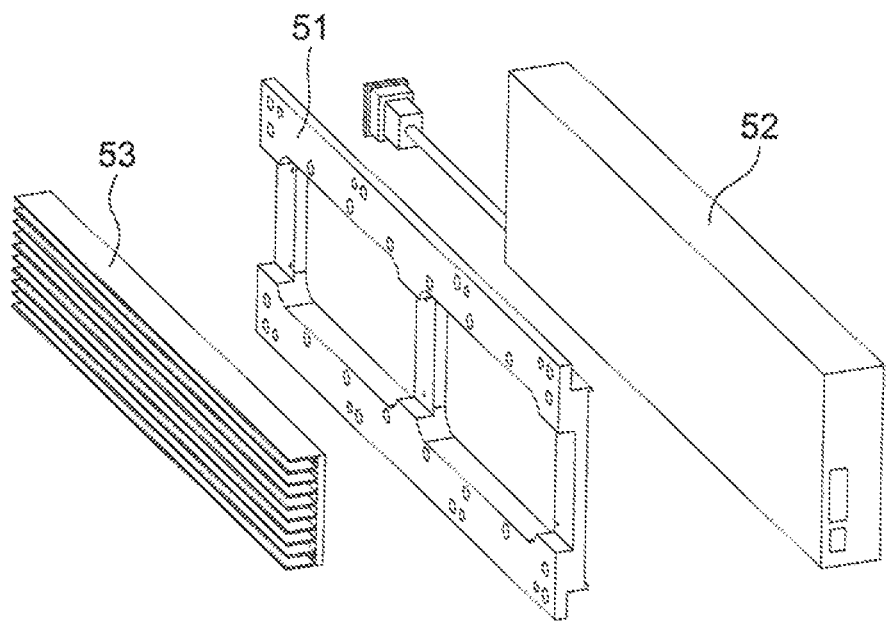
FIG. 12 is an exploded perspective view of the coil unit shown in FIG. 11.

As shown in FIGS. 11 and 12, the coil unit 50 is integrated so that a coil mounting plate 51 is sandwiched between a coil unit main body 52 and a cooling fin 53. As shown in FIG. 12, the coil mounting plate 51 has a frame structure so that heat generated by the coil unit main body 52 can be efficiently dissipated via the cooling fin 53.

The assembly of the linear actuator 10 will be described.

The magnet unit 40 mounted on the slide base 47 is inserted from the mounting port 24 of the casing main body 21, and the protruding portion 44 of the magnet mounting plate 41 is protruded from the slide groove 25 and positioned. Then, the slide base 47 is fixed to the bottom surface of the casing main body 21.

Furthermore, the scale base 35 and the guide rail 37 are attached to the upper end edge portion of the protruding portion 44 protruding from the slide groove 25. Next, the detection head 36 is attached to the upper surface of the casing main body 21, and the linear encoder 34 is assembled. Furthermore, the guide block 38 engaged with the guide rail 37 is fixed to the upper surface of the casing main body 21.

A ball screw 33 is fixed to the protruding portion 44, and a coupling shaft 32 inserted through the ball screw 33 is coupled to the rotary encoder 30 via a coupling member 31.

Next, the coil units 50 and 50 are assembled and fixed from the mounting ports 26 and 27 on both sides of the casing main body 21, respectively. Finally, fixing the clamp member 49 to one end side in the X-axis direction of the vertical board 43 of the magnet mounting plate 41 via the mounting ports 26, 27, and 28 of the casing main body 21 (FIG. 1) completes the assembly work.

According to the present embodiment, the magnet unit 40 is positioned and fixed in the casing main body 21, and then the coil units 50 and 50 are assembled from both sides of the casing main body 21. Therefore, a small linear actuator not only excellent in assembly performance but also easy to adjust can be obtained. In particular, since the linear actuator according to the present invention does not require a large mounting area, there is an advantage that it can be mounted even on a tufting machine having a small installation space.

Figure 3:
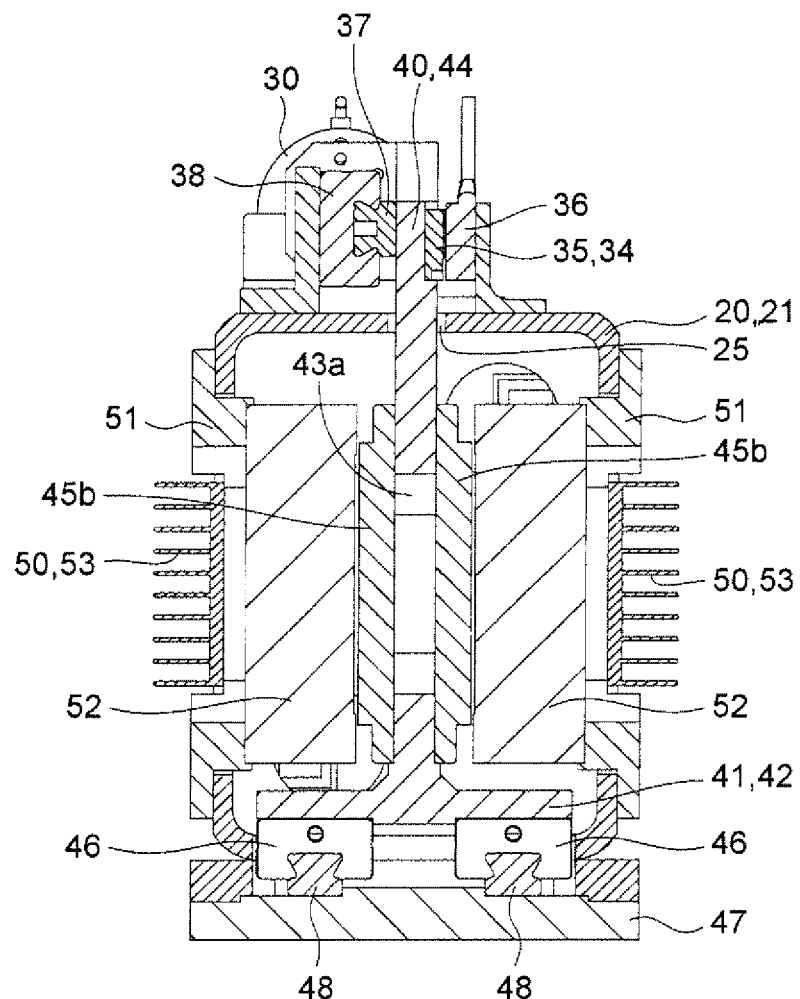
FIG. 3 is a cross-sectional view taken along line III-III shown in FIG. 2.
Figure 4:
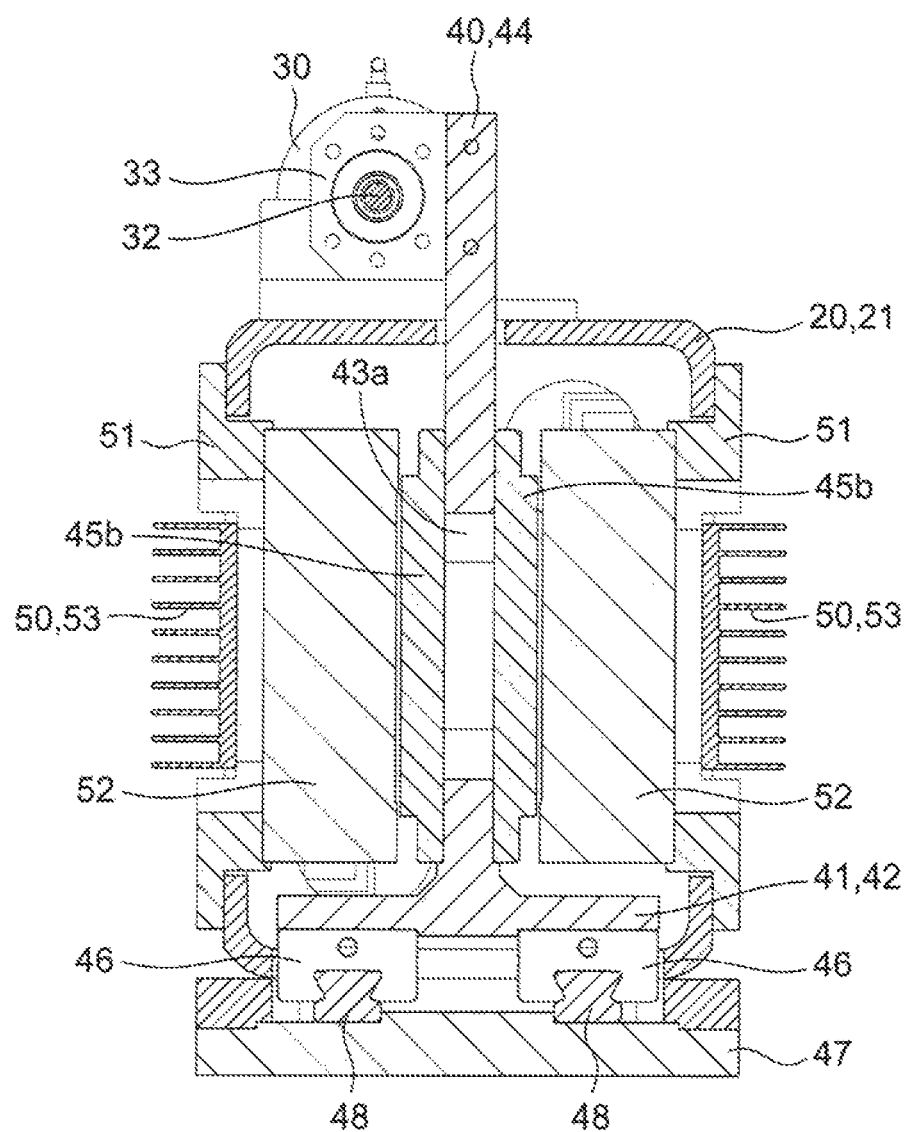
FIG. 4 is a cross-sectional view taken along line IV-IV shown in FIG. 2.

As shown in FIGS. 3 and 4, in the linear actuator 10, based on magnetization and demagnetization of the coil unit main body 52, due to attraction and repulsion between the coil unit main body 52 and the magnets 45a, 45b, and 45c, the magnet mounting plate 41 reciprocates in the X-axis direction by the magnetic force, that is, in the direction perpendicular to the paper surface.

Figure 13:
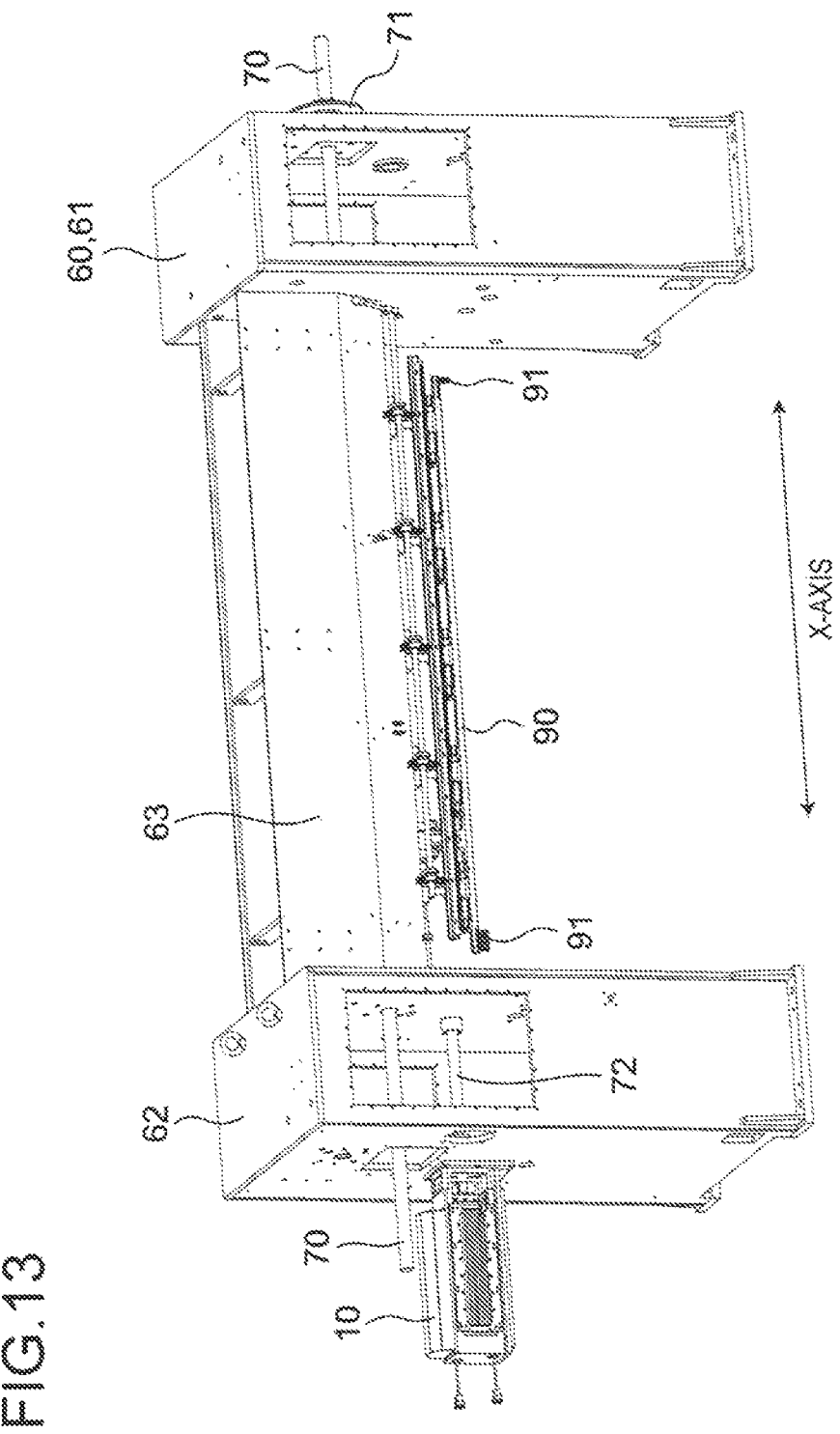
FIG. 13 is a perspective view showing a tufting machine to which a linear actuator according to the present invention is attached.

Next, as illustrated in FIG. 13, a case where the linear actuator 10 according to the above-described embodiment is attached to the tufting machine 60 will be described. The tufting machine 60 is a type of forming a loop by reciprocating a single needle bar 90 in the X-axis direction.

The tufting machine 60 has an approximately portal shape in which a horizontal frame 63 having a U-shape in cross section is bridged between a pair of vertical frames 61 and 62. Then, the linear actuator 10 is attached to the outward surface of the vertical frame 62 out of the outward surfaces of the vertical frames 61 and 62 opposite to each other.

Figure 14:
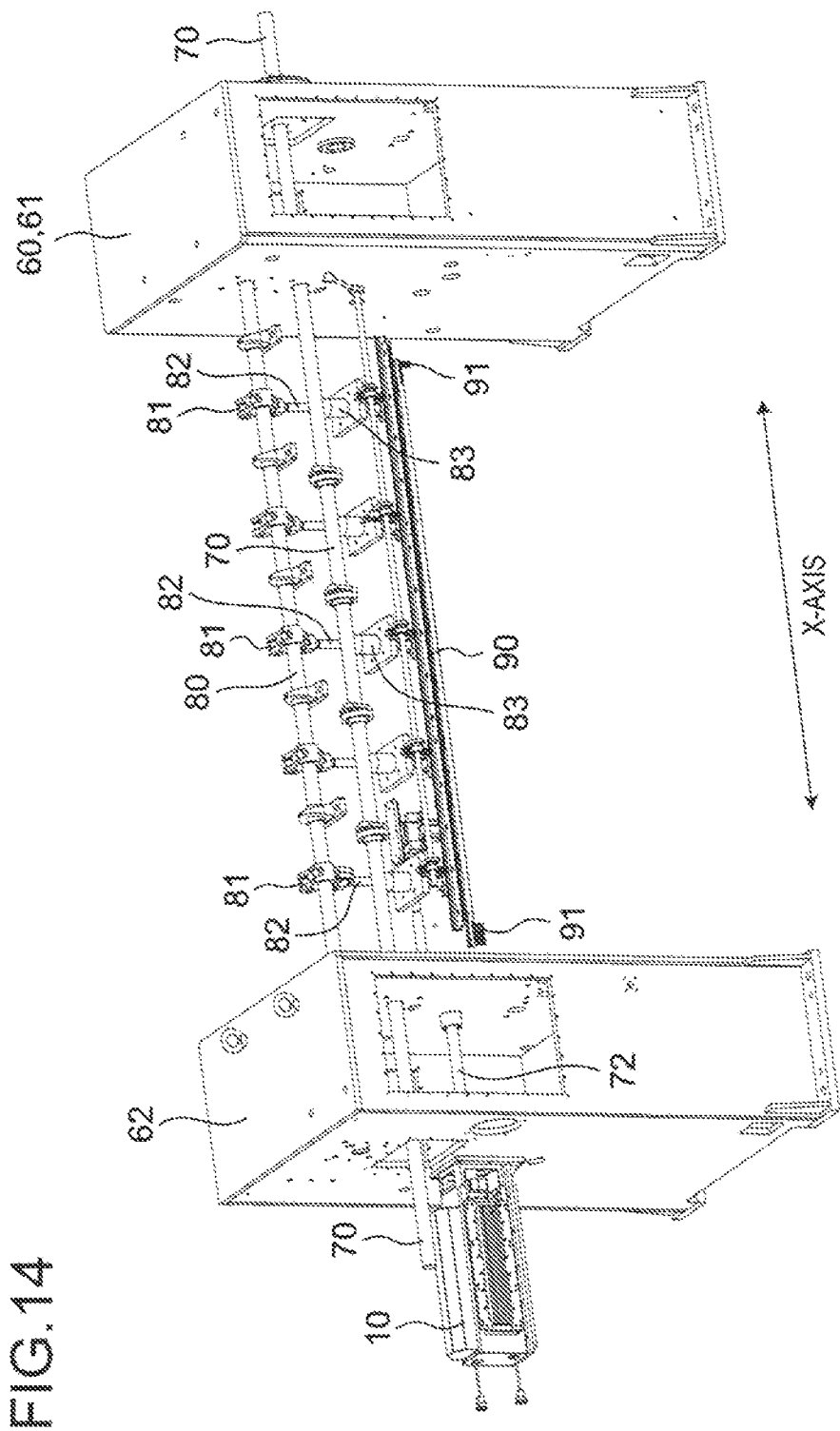
FIG. 14 is a perspective view showing a state where a horizontal frame is removed from the tufting machine shown in FIG. 13.

As shown in FIG. 14, the horizontal frame 63 houses a main shaft 70 and a needle shaft 80 which are bridged between the pair of vertical frames 61 and 62.

The main shaft 70 rotates at a high speed in one direction via a motor and a belt (not shown). Then, the rotational motion of the main shaft 70 causes the needle shaft 80 to alternately rotate in the forward and reverse directions via an eccentric cam mechanism (see FIGS. 17 and 18) arranged in the vertical frame 62.

Figure 17:
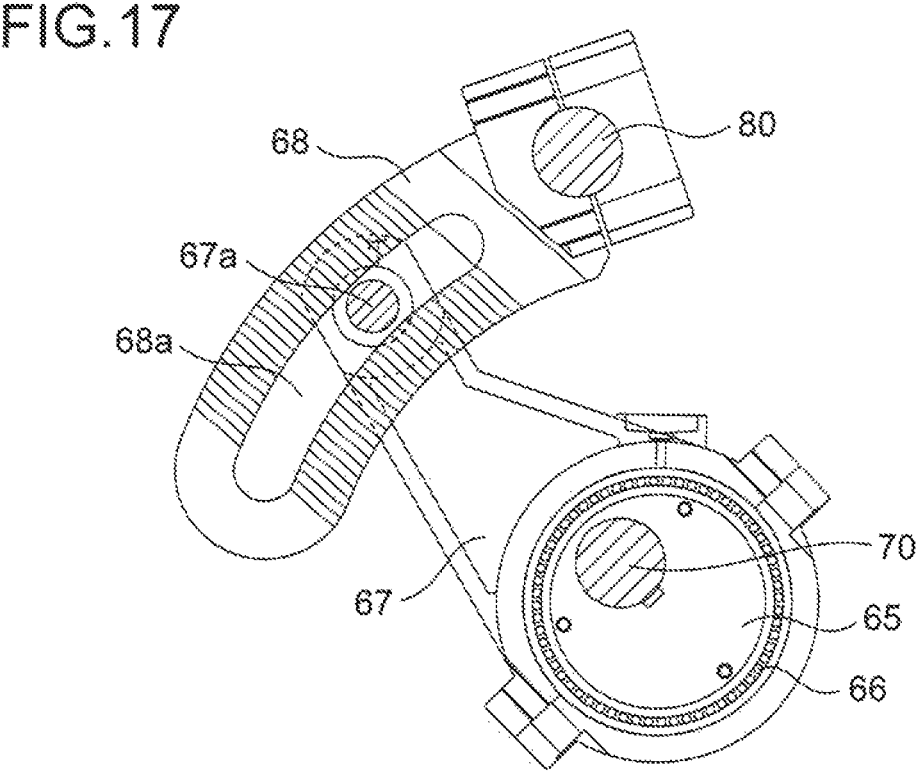
FIG. 17 is an enlarged cross-sectional view showing a state before the operation of the eccentric crank mechanism arranged in the vertical frame shown in FIG. 14.
Figure 18:
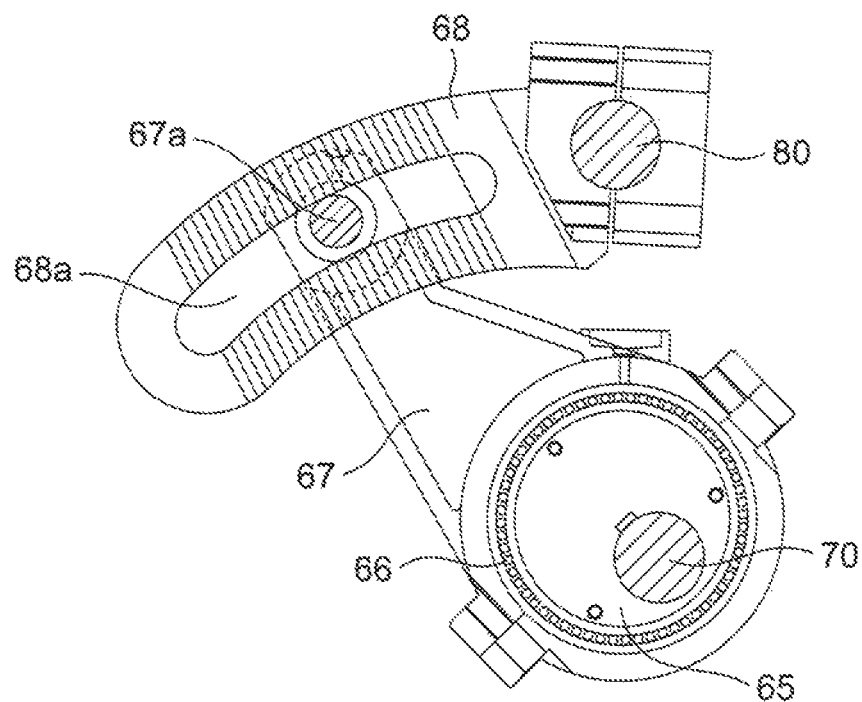
FIG. 18 is an enlarged cross-sectional view showing a state after the operation of the eccentric crank mechanism shown in FIG. 17.

In the eccentric cam mechanism housed in the vertical frame 62, as shown in FIGS. 17 and 18, the main shaft 70 is inserted at a position eccentric to the needle cam 65. Therefore, when the main shaft 70 rotates in one direction, the needle cam arm 67 swings via the bearing 66. Then, the pin 67a provided at the tip of the needle cam arm 67 reciprocates in the curved guide groove 68a of the needle lever 68. As a result, the needle lever 68 swings up and down, so that the needle shaft 80 attached to the needle lever 68 rotates alternately in the forward and reverse directions.

Figure 16:
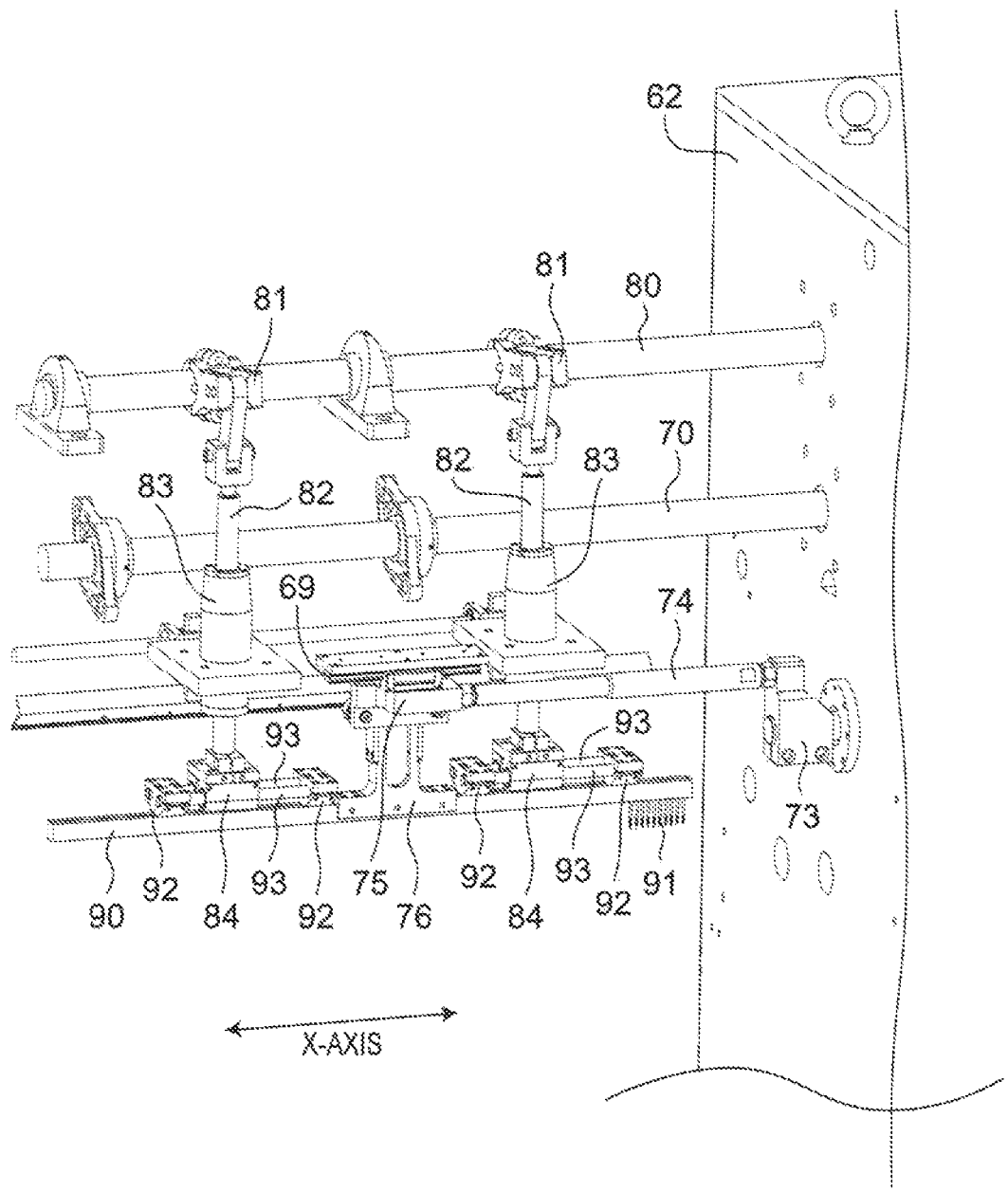
FIG. 16 is an enlarged perspective view of a main part of the tufting machine shown in FIG. 15.

As shown in FIG. 16, the needle shaft 80 is connected to the push rod 62 via a crank mechanism 81 arranged at a predetermined interval. A needle bar carrier 84 is attached to the lower end of the push rod 82. The needle bar carrier 84 is slidably inserted through two slide bars 93 and 93. Both ends of the two slide bars 93 and 93 are coupled to the needle bar 90 via guide brackets 92 and 92. The needle bar 90 has a large number of needles 91 arranged in parallel on the same straight line. Therefore, the needle bar 90 is supported to be capable of reciprocating up and down, and is supported to be capable of reciprocating also in the X-axis direction. As a result, when the push rod 82 reciprocates up and down, the needle bar 90 and the needle 91 reciprocate up and down.

It should be noted that the push rod 82 is supported via a push rod housing 83 fixed in the horizontal frame 63 described above.

Figure 15:
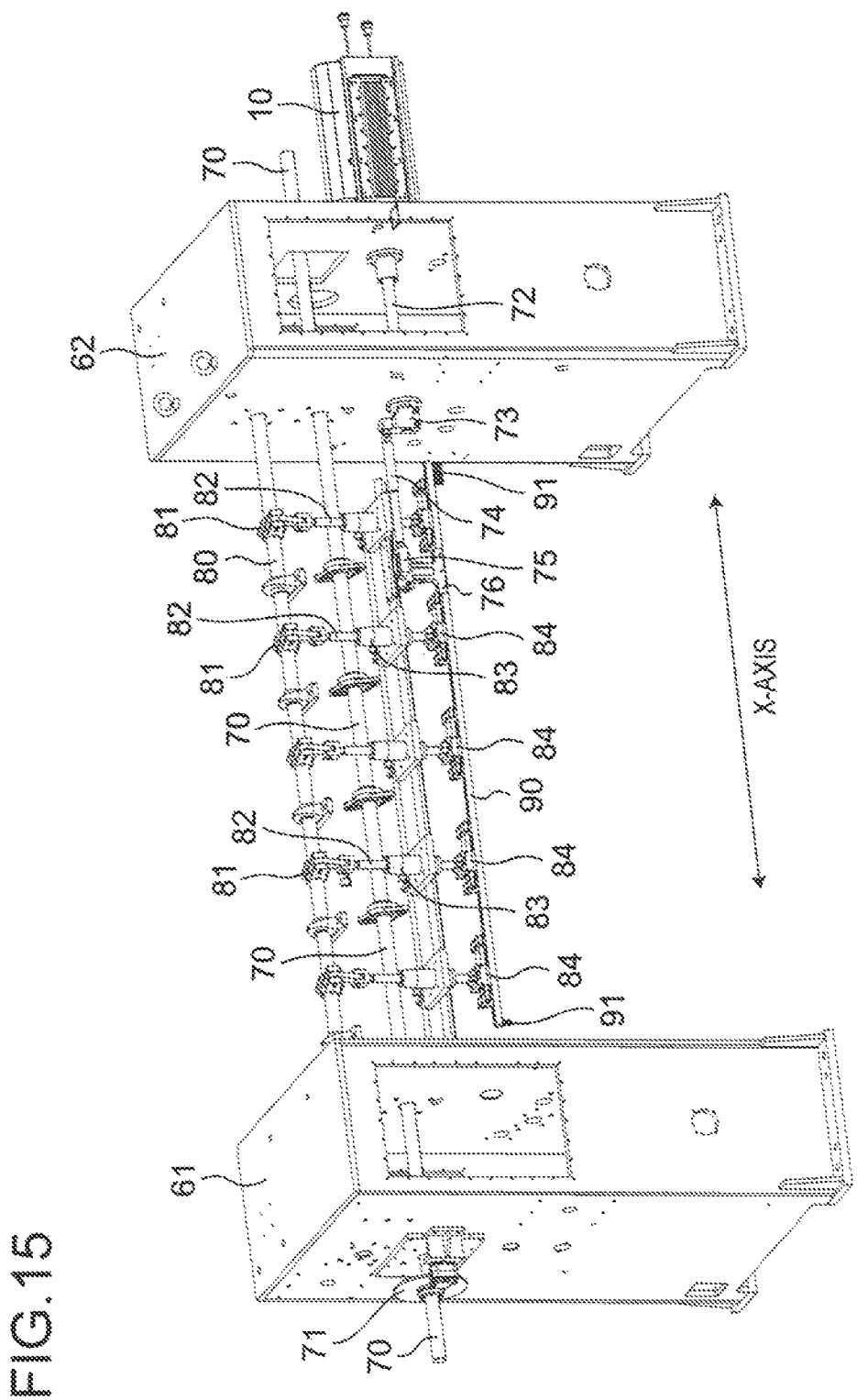
FIG. 15 is a perspective view of the tufting machine shown in FIG. 14 as viewed from a different angle.

As shown in FIG. 15, the drive shaft 72 is coupled to the clamp member 49 of the linear actuator 10 attached to the vertical frame 62. The drive shaft 72 is connected to a coupling bar 74 via a coupling block 73. Then, as shown in FIG. 16, a guide block 75 is fixed to the tip of the coupling bar 74. The guide block 75 is slidably engaged with a guide rail 69 fixed in the horizontal frame 63, and is fixed to the needle bar 90 via a needle bar bracket 76. Therefore, when the coupling bar 74 reciprocates in the X-axis direction based on the drive of the linear actuator 10, the needle bar 90 and the needle 91 reciprocate in the X-axis direction via the guide block 75 and the needle bar bracket 76.

On the upper surface of the needle bar 90, as described above, a plurality of sets of a pair of guide brackets 92 and 92 as one set are fixed at predetermined pitches. Two slide bars 93 and 93 are bridged in parallel between the pair of guide brackets 92 and 92. Then, the needle bar carrier 84 is slidably inserted through the two slide bars 93 and 93 as described above. Therefore, the needle bar carrier 84 is not in direct contact with the needle bar 90.

It should be noted that the needle bar 90 has a plurality of needles 91 arranged on the lower surface thereof in one row on the sane straight line, but the needles 91 need not necessarily be arranged in one row. If necessary, for example, the plurality of needles 91 may be arranged in two rows or three rows. In addition, the number of needle bars 90 is not necessarily one, and a plurality of needle bars 90 may be arranged in parallel.

Figure 19:
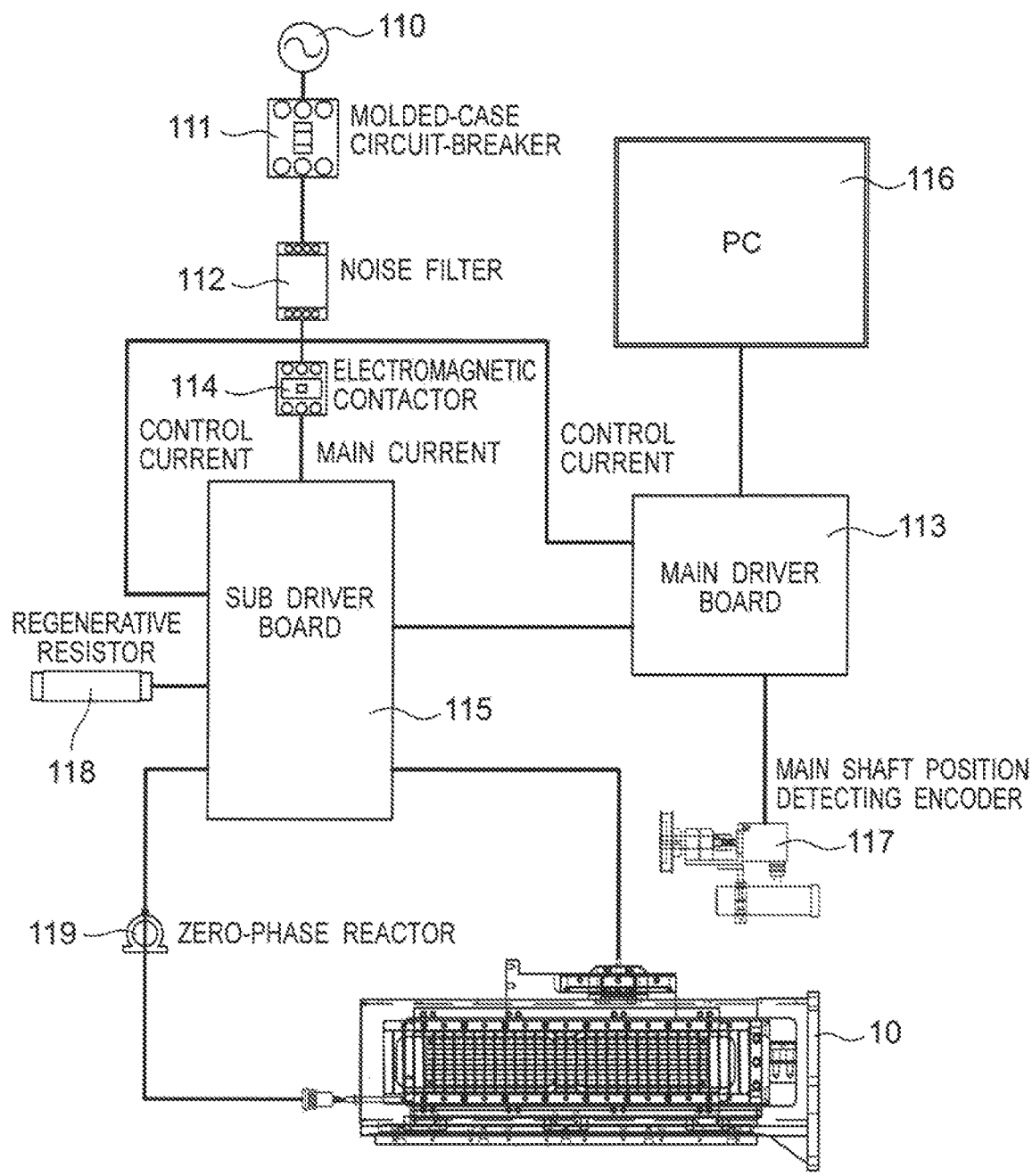
FIG. 19 is a block diagram showing connections of electrical apparatuses for operating the tufting machine.

The above-described linear actuator 30 is connected as shewn in the block diagram shown in FIG. 19.

That is, the power source 110 is connected to a noise filter 112 via a molded-case circuit-breaker 111. The noise filter 112 is connected to a main driver board 113, and to a sub driver board 115 via an electromagnetic contactor 114. The main driver board 133 connected to the PC 116 is connected to the main shaft position detecting encoder 117 and also connected to the sub driver board 115. The sub driver board 115 includes a regenerative resistor 118 and is connected to the linear actuator 10 via a zero-phase reactor 119.

It should be noted that the main shaft position detecting encoder 117 is, for example, arranged on the outward surface of the vertical frame 62, is connected to the main shaft 70 via a timing pulley and a timing belt (not shown), detects the rotation conditions of the main shaft 70, and the detection result is transmitted to the main driver board 113. Therefore, the PC 110 can check the rotation conditions of the main shaft 70 in real time.

Next, based on FIGS. 20 to 25, the interlocking operation between the tufting machine 60 and the linear actuator 10 will be described.

Figure 20:
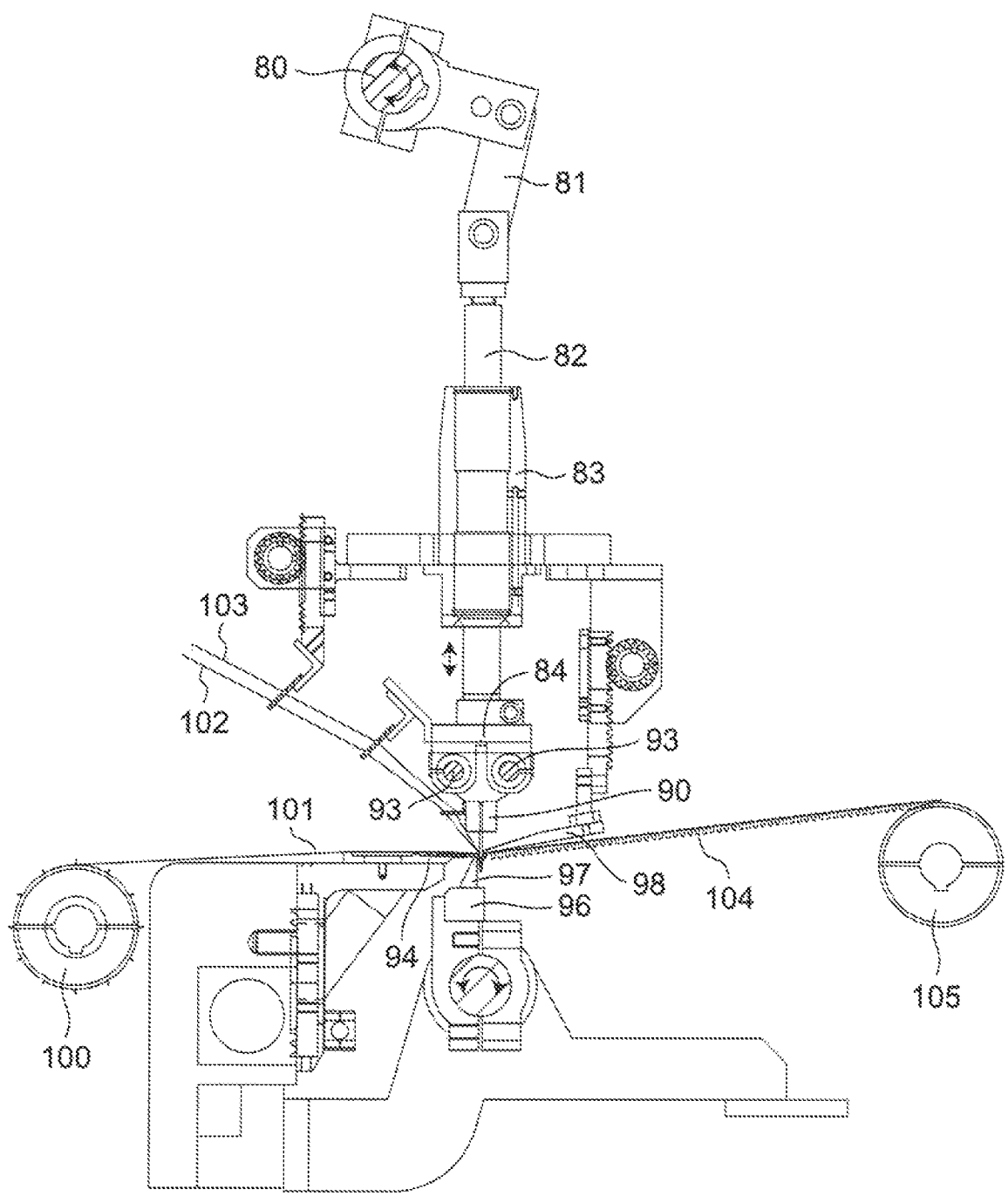
FIG. 20 is a schematic diagram showing a main part of a tufting machine.

As shown in FIG. 20, the carpet in which the loops 104 are formed by sewing the threads 102 and 103 into the base fabric 101 drawn from the first roll 100 is wound around the second roll 105. The thread 102 is pulled out through the guide hole of the guide plate, inserted through the needle hole of the needle 91, and sewn into the base fabric 101.

Figure 21:
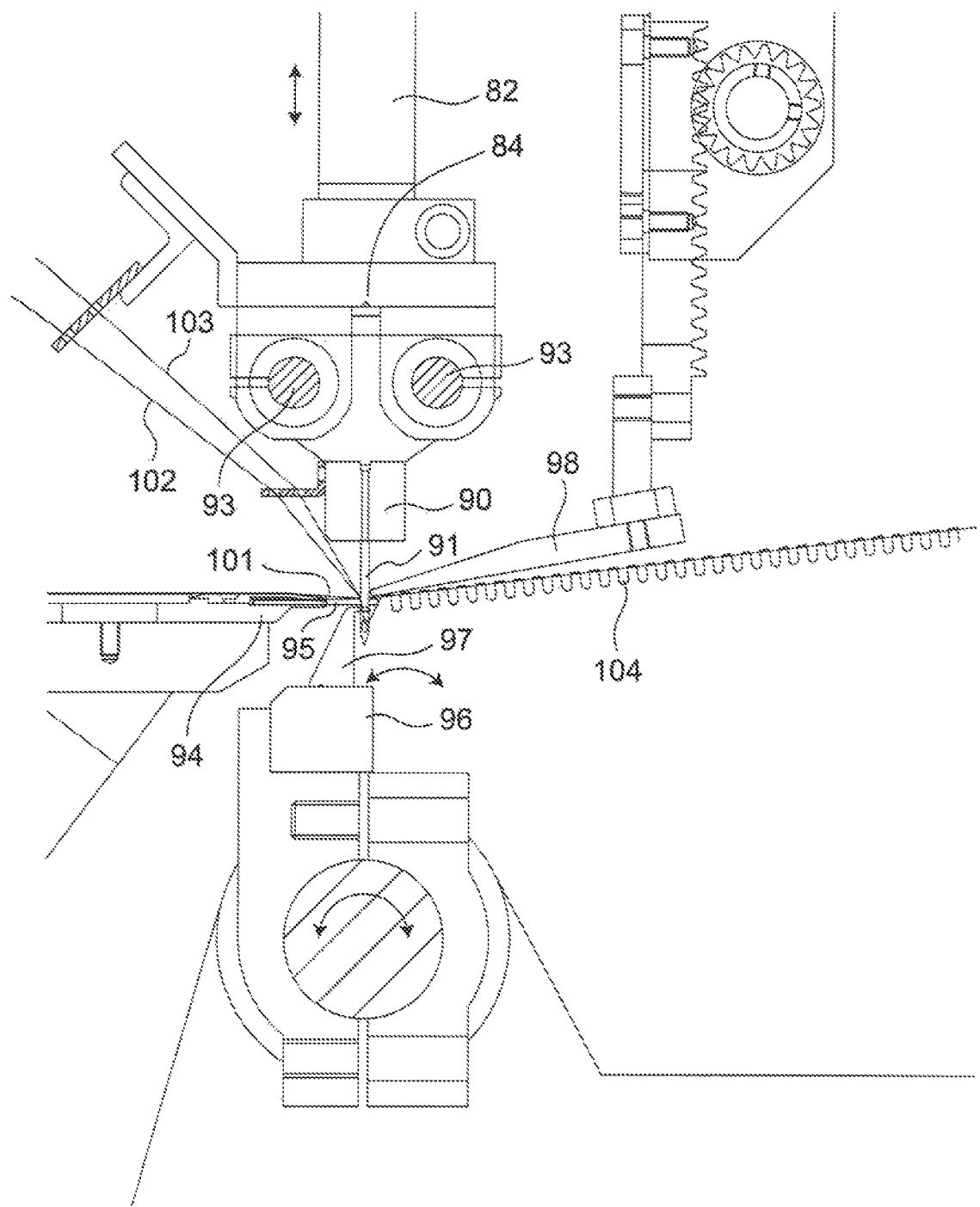
FIG. 21 is an enlarged view of a main part of the schematic diagram shown in FIG. 20.
Figure 22:
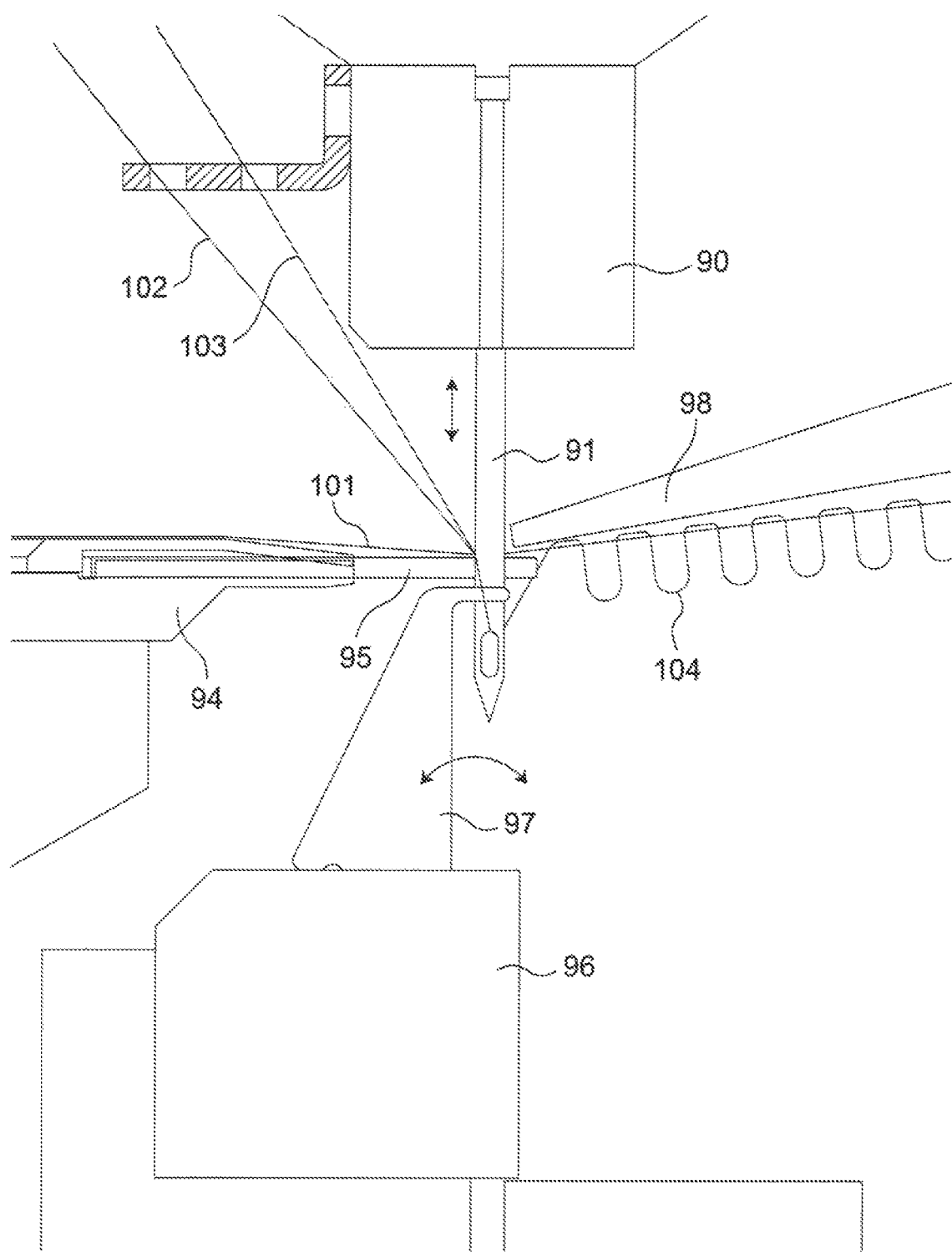
FIG. 22 is a partially enlarged view of the main part enlarged view shown in FIG. 21.

When the main shaft 70 rotates in one direction caused by the rotation of a motor (not shown) via a belt, the needle shaft 80 alternately rotates in the forward and reverse directions via the eccentric cam mechanism shown in FIGS. 17 and 18. Therefore, as shown in FIG. 21, the push rod 82 reciprocates up and down via the crank mechanism 81 attached to the needle shaft 80. As a result, the needle bar 30 and the needle 91 positioned on the tip side of the push red 82 reciprocate, and the thread 102 is continuously sewn into the base fabric 101 (FIG. 22).

It should be noted that in FIG. 21, the presser foot 98 positioned on the right side of the needle 91 is for preventing the base fabric 101 and the carpet from being lifted. The presser foot 98 can be adjusted by causing the presser foot 98 to move up and down via a rack and a pinion.

The needle bar 90 in which the needles 91 are arranged in parallel is supported to be reciprocally movable in the direction perpendicular to the paper surface via the needle bar carrier 84 and the slide bars 93 and 93.

A looper 97 positioned immediately below the needle 91 is attached to a rotatable looper block 96.

A large number of finger portions 95 are arranged in parallel on the finger plate 94. Then, the needles 91 are arranged so as to descend one by one between the adjacent finger portions 95 and 95.

FIG. 22 shows a state where the needle 91 descends, passes between the finger portions 95 and 95 arranged in parallel, penetrates the base fabric 101, reaches the bottom dead center being the lowest position, and then immediately before the needle 91 is about to rise. Therefore, the thread 102 stretched through the guide hole of the guide plate is in a state of being pulled down to the lowest point. At this time, the looper 97 enters between the needle 91 and the thread 102, and the looper 97 can be locked to the thread 102.

Figure 23:
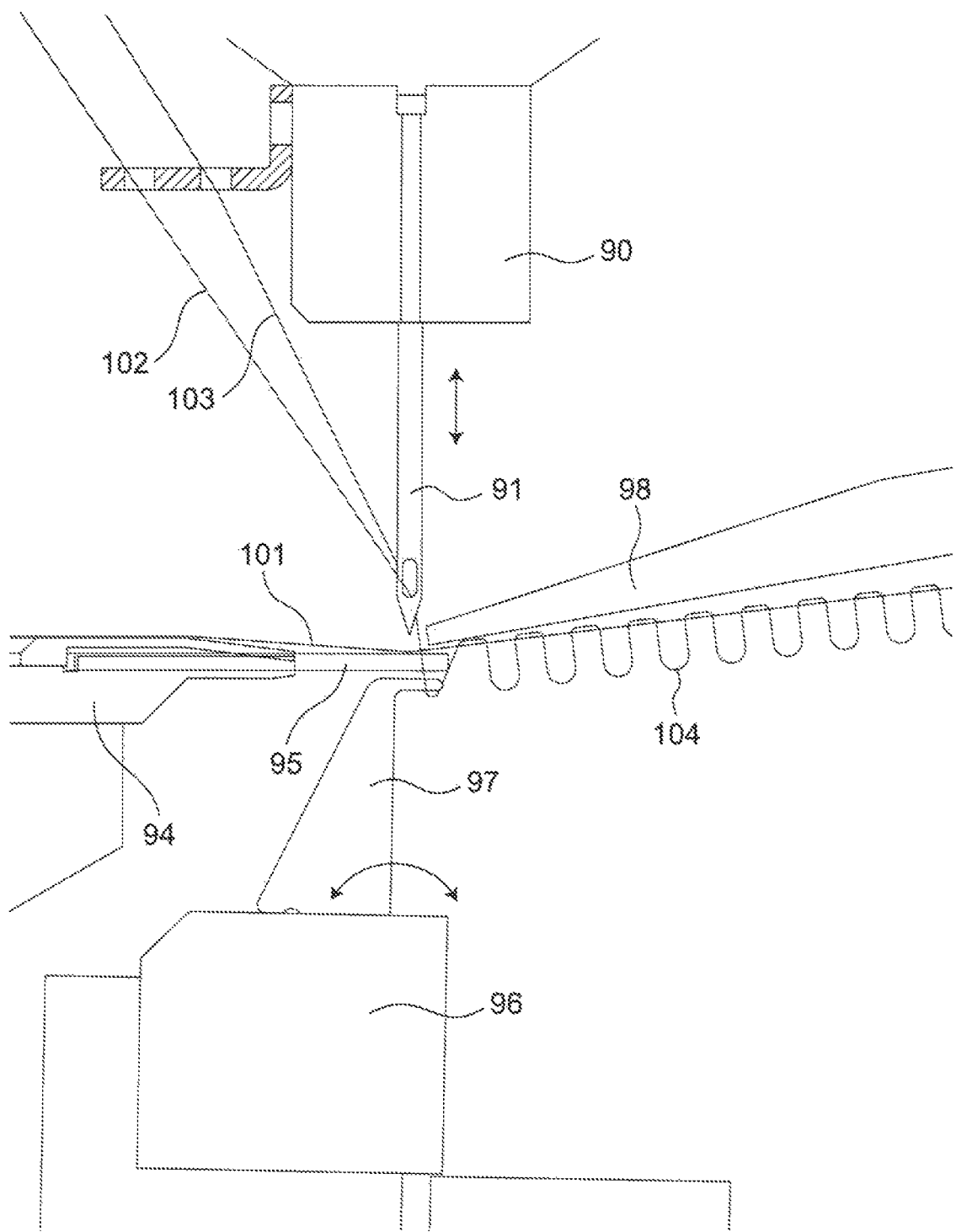
FIG. 23 is a partially enlarged view showing a next process continued from the manufacturing process of the partially enlarged view shown in FIG. 22.
Figure 24:
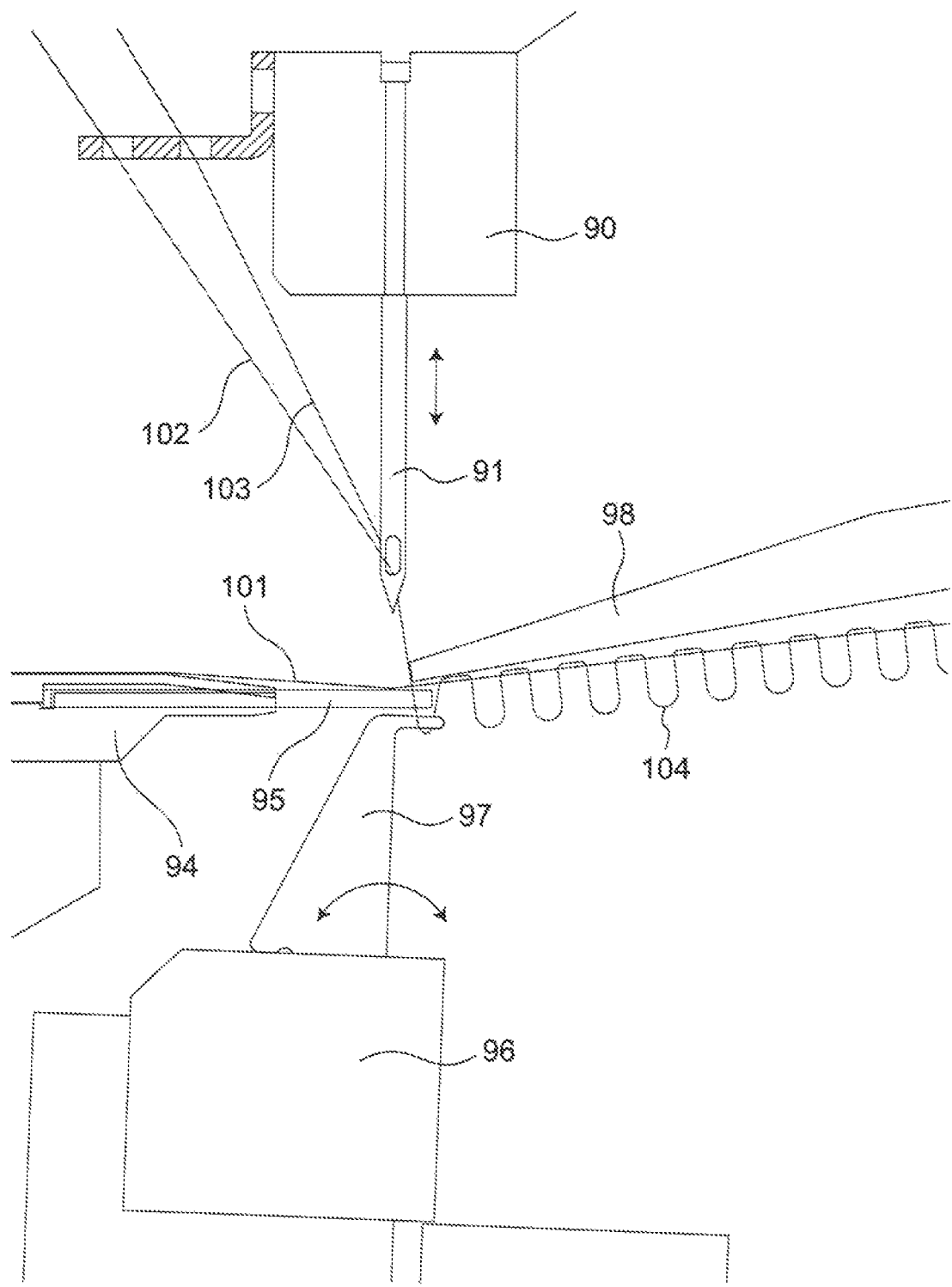
FIG. 24 is a partially enlarged view showing a next process continued from the manufacturing process of the partially enlarged view shown in FIG. 23.

As shown in FIGS. 23 and 24, even when the needle 91 is pulled up, and pulled out from the base fabric 101, the looper 97 maintains the state of remaining locked to the thread 102. Therefore, the loop 104 having a predetermined height can be formed without the thread 102 being pulled back. Then, immediately after the needle 91 is pulled out from the base fabric 101, depending on the pattern to be formed, the needle bar 90 is appropriately moved in a direction orthogonal to the paper surface by the drive of the linear actuator 10.

Figure 25:
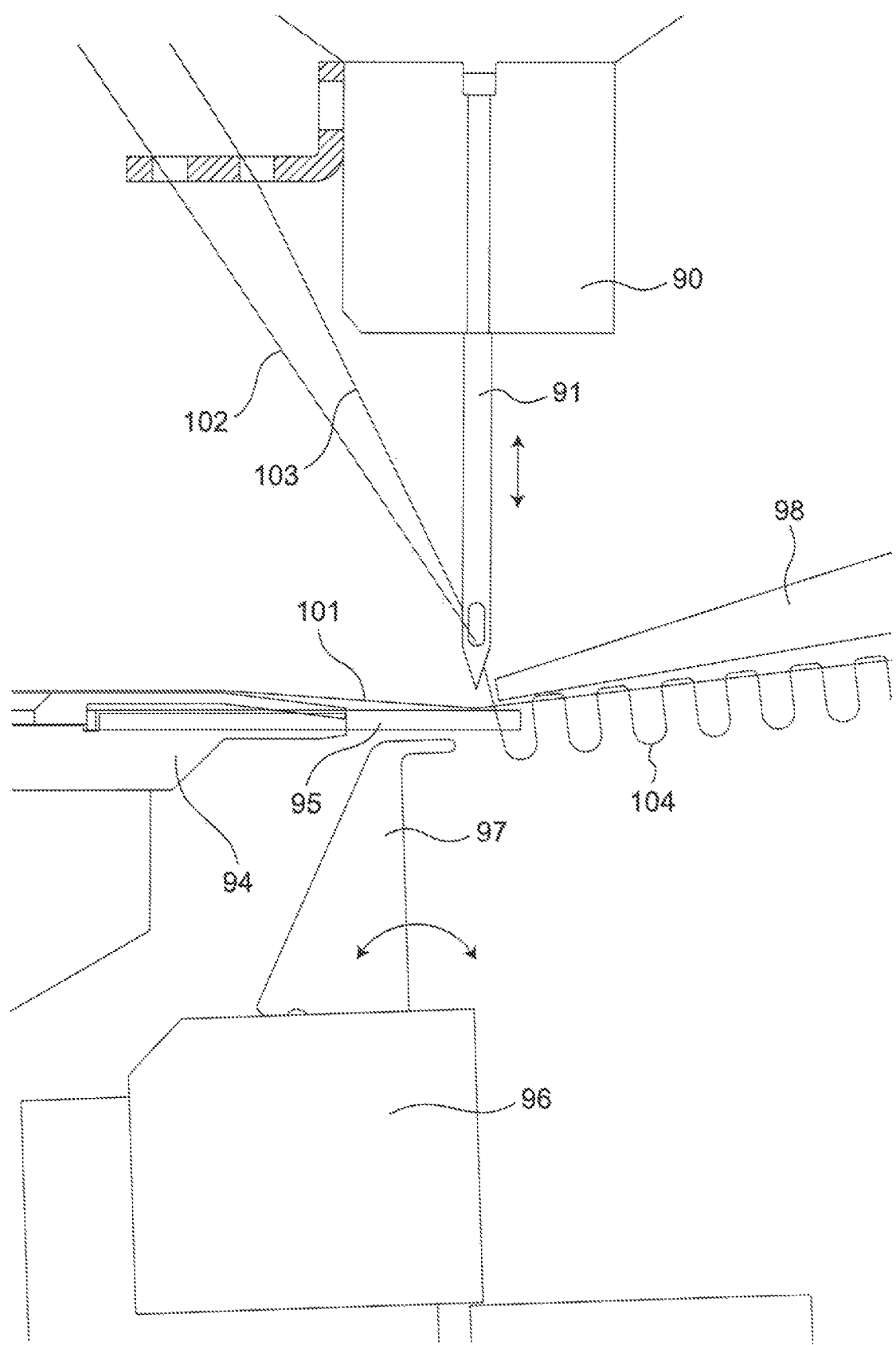
FIG. 25 is a partially enlarged view showing a next process continued from the manufacturing process of the partially enlarged view shown in FIG. 24.

Furthermore, as shown in FIG. 25, when the needle 91 starts to descend again, the looper 97 rotates in the reverse direction to return to the original position, thereby avoiding a collision with the needle 91.

Thereafter, repeating the same operation completes a carpet having a pattern while forming the loop 104.

In the above-described embodiment, a case has been described in which one linear actuator is attached to one tufting machine and one needle bar is reciprocated in the axial direction. However, the present invention is not limited to this, and for example, a linear actuator may be attached to each of the two vertical frames of a tufting machine, and each of the two needle bars arranged in parallel may be reciprocated in the axial direction.

In addition, in the above-described embodiment, the looper that forms the loop pile is described. However, the present invention is not limited to this, and for example, may be applied to a looper that forms a cut pile or a cut-and-loop pile.

EXAMPLE

Example 1

The linear actuator according to the embodiment was attached to an existing tufting machine, the attached machine was driven, and the drive limit was examined.

The main shaft of the existing tufting machine was rotated at a maximum rotational speed of 1142 rpm being the limit value of the tufting machine, and the needle bar was moved up and down. It was confirmed that the reciprocating motion in the axial direction of the needle bar driven by the linear actuator according to the present invention can be followed without any problems.

Comparative Example 1

An actuator formed by combining a servo motor (SGMGV-44DDA21 manufactured by YASKAWA ELECTRIC CORPORATION) and a ball screw (BLK3232-3.6 manufactured by THK) was attached to an existing tufting machine. Then, the attached machine was driven in the same manner as in Example 1. When the rotational speed of the main shaft began to exceed 600 rpm, abnormal noise began to occur, and it was found that the reciprocating motion in the axial direction of the needle bar could not follow the vertical motion of the needle bar.

From the above experiments, it was found that if the linear actuator of the present invention is used, the main shaft can be rotated at a rotational speed at least twice as high as that in the case where the existing actuator is used. Therefore, it was clarified that the productivity of the tufting machine is remarkably improved by using the linear actuator of the present invention.

Example 2

The linear actuator of the present application was mounted as a needle bar reciprocating drive mechanism on an existing actual tufting machine (model 2.15M×1/10G ICY LOOP machine, serial number No. 185, manufactured by Michishita Iron Works Co., Ltd.). The maximum weaving width dimension of the actual machine was 2.15 meters, and the distance between the needles was 1/10 inch. Then, in order to detect whether the needle maintains repeatability of positioning, that is, whether the needle is greatly displaced from a predetermined position, a linear scale (NSR-LHDAE5A10-001U manufactured by Mitutoyo Corporation) was used.

The rotational speed of the tufting machine was set to 1140 rpm being the maximum allowable rotational speed of the tufting machine.

In addition, the moving amount of the needle was 2.54 mm per pitch. Then, the movement pattern of, while following the needle stroke, moving the needle 4 times by 1 pitch to one side and then moving the needle 4 times by 1 pitch to the opposite side was repeated and experimented.

Furthermore, the lead factor of the linear actuator at a continuous operation time of 6 hours and a rotational speed of 1140 rpm was set to 43%, and the repeatability of positioning was set to ±0.03 mm.

It should be noted that when the needle could not maintain repeatability of positioning of ±0.03 mm, the tufting machine was set to automatically stop.

It should be noted that the load factor refers to the ratio of the driving force necessary to drive the needle bar when the maximum driving force of the linear actuator of the present invention is set to 100%. Normally, the load factor increases as the rotational speed increases.

In addition, the repeatability of positioning refers to a value obtained by a performance evaluation method conforming to JIS B 6192. Specifically, positioning from the same direction at any one point is repeated 7 times, the stop position is measured, and ½ of the maximum difference in reading is obtained. This measurement is performed at the respective positions of the center and approximately both ends of the movement distance, and the maximum value of the obtained values is taken as the measurement value, and the value represented by adding ± sign to the measurement value is referred to as "repeatability of positioning".

As a result of the experiment according to Example 2, the carpet production capacity averaged 53 m²/hour.

The reasons why Example 2 has high productivity include a point that the operation of the linear actuator could follow the operation of the maximum allowable rotational speed of 1140 rpm of the tufting machine, and a point, that since the repeatability of positioning was high, the stop time due to thread breakage was shortened.

It should be noted that in the visual observation, the driving state of the linear actuator of the present invention was stable and a surplus capacity was felt. Therefore, it was found that if the rotational speed of the tufting machine can be further increased, the production capacity can be further improved.

Comparative Example 2

A needle bar reciprocating drive mechanism including a servo motor and a ball screw was mounted on the tufting machine used in Example 2.

That is, the needle bar reciprocating drive mechanism drives a servo motor (SGMSV-25DDA21 manufactured by YASKAWA ELECTRIC CORPORATION) with a servo driver (SGDV-120D01A manufactured by YASKAWA ELECTRIC CORPORATION), and reciprocates and drives the needle bar via a ball screw (BLK3232-3.6 manufactured by THK).

It should be noted that when the rotational speed of the tufting machine began to exceed 600 rpm, the needle bar reciprocating drive mechanism including the servo motor and the ball screw could not follow the speed of the tufting machine and could not maintain the repeatability of positioning. Therefore, in Comparative Example 2, the rotational speed of the tufting machine was set to 600 rpm. The other experimental conditions were the same as in Example 2, and the production capacity was measured by performing the drive for 6 hours continuously.

As a result of the experiment according to Comparative Example 2, the carpet production capacity averaged 26 m²/hour.

From the above experimental results, it was found that the case of using the linear actuator of the present invention (Example 2) as a needle bar drive mechanism can operate at a rotational speed of at least twice as much as the rotational speed of the case of using the existing needle bar drive mechanism (Comparative Example 2). As a result, according to the present invention, it was clarified that productivity is not less than doubled.

In addition, it was found that even if the rotational speed of the tufting machine is further increased, it is considered that the linear actuator of the present invention can sufficiently follow, so that productivity can be nade still higher.

INDUSTRIAL APPLICABILITY

In the above-described embodiment, the case of applying the present invention to a tufting machine is described, but needless to say, the present invention may be used for other manufacturing apparatuses.

What is claimed is:
1. A linear actuator comprising:
a casing;
a magnet unit; and
a coil unit,
wherein:
the casing is tubular;
the magnet unit includes: (i) a magnet and (ii) a horizontal board and a vertical board defining a magnet mounting plate having an inverted T-shape in cross section;
the magnet is configured to sandwich side surfaces of the vertical board;
the magnet unit is configured to reciprocate along an axial direction in the casing;
the coil unit faces the magnet
a slide base is fixed to a bottom surface of the casing;
two guide rails are arranged on the slide base in parallel along the axial direction, the two guide rails being configured to guide side edges of a lower surface of the horizontal board;
a slide groove is defined on an upper surface of the casing along the axial direction;
a protruding portion of the vertical board protrudes through the slide groove;
a guide block is fixed on the upper surface of the casing along the axial direction;
the guide block is configured to guide the protruding portion of the vertical board; and
the magnet unit is configured to reciprocate within the coil unit based on magnetization and demagnetization of the coil unit.
2. The linear actuator according to claim 1, further comprising a cooling fin on an outward surface of the coil unit.
3. A tufting machine comprising:
a linear actuator configured to be used as a drive source for reciprocating a needle bar in an axial direction,
wherein the linear actuator comprises:
a casing;
a magnet unit; and
a coil unit,
wherein:
the casing is tubular;

the magnet unit includes: (i) a magnet and (ii) a horizontal board and a vertical board defining a magnet mounting plate having an inverted T-shape in cross section;

the magnet is configured to sandwich side surfaces of the vertical board;

the magnet unit is configured to reciprocate along an axial direction in the casing;

the coil unit faces the magnet a slide base is fixed to a bottom surface of the casing;

two guide rails are arranged on the slide base in parallel along the axial direction, the two guide rails being configured to guide side edges of a lower surface of the horizontal board;

a slide groove is defined on an upper surface of the casing along the axial direction;

a protruding portion of the vertical board protrudes through the slide groove;

a guide block is fixed on the upper surface of the casing along the axial direction;

the guide block is configured to guide the protruding portion of the vertical board; and the magnet unit is configured to reciprocate within the coil unit based on magnetization and demagnetization of the coil unit.

4. The tufting machine according to claim 3, further comprising a cooling fin on an outward surface of the coil unit.

5. The tufting machine according to claim 4, wherein the needle bar is one of plural needle bars arranged in parallel.

6. The tufting machine according to claim 3, wherein the needle bar is one of plural needle bars arranged in parallel.

\* \* \* \* \*